(12) United States Patent
Nakajima et al.

(10) Patent No.: US 11,301,122 B2
(45) Date of Patent: Apr. 12, 2022

(54) SERVO MOTOR ADJUSTING DEVICE AND SERVO MOTOR ADJUSTING METHOD

(71) Applicant: OMRON Corporation, Kyoto (JP)

(72) Inventors: Kenji Nakajima, Hannan (JP); Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/644,185

(22) PCT Filed: Oct. 12, 2018

(86) PCT No.: PCT/JP2018/038194
§ 371 (c)(1),
(2) Date: Mar. 4, 2020

(87) PCT Pub. No.: WO2019/078129
PCT Pub. Date: Apr. 25, 2019

(65) Prior Publication Data
US 2020/0201527 A1 Jun. 25, 2020

(30) Foreign Application Priority Data
Oct. 20, 2017 (JP) .............................. JP2017-203422

(51) Int. Cl.
*G06F 3/0482* (2013.01)
*G05B 19/4093* (2006.01)
(Continued)

(52) U.S. Cl.
CPC ......... *G06F 3/04847* (2013.01); *G05B 17/02* (2013.01); *G05B 19/409* (2013.01);
(Continued)

(58) Field of Classification Search
None
See application file for complete search history.

(56) References Cited

U.S. PATENT DOCUMENTS

| 5,475,291 A | 12/1995 | Yoshida et al. |
| 6,198,246 B1 * | 3/2001 | Yutkowitz .............. G05B 11/42 |
| | | 318/561 |

(Continued)

FOREIGN PATENT DOCUMENTS

| EP | 3171237 A1 | 5/2017 |
| EP | 3594760 A1 | 1/2020 |

(Continued)

OTHER PUBLICATIONS

English translation of the International Search Report("ISR") of PCT/JP2018/038194 dated Jan. 8, 2019.
(Continued)

*Primary Examiner* — Linda Huynh
(74) *Attorney, Agent, or Firm* — Metrolex IP Law Group, PLLC

(57) ABSTRACT

Measurement data is managed such that the measurement data can be visualized and recorded in association with a condition set during servo control adjustment. The adjustment device obtains the parameter setting condition and measurement data in association with each other, and saves drawing information based on the measurement data and the setting condition as the same file content.

15 Claims, 14 Drawing Sheets

(51) Int. Cl.
*G06F 3/04847* (2022.01)
*G06T 11/20* (2006.01)
*G05B 19/4069* (2006.01)
*G05B 19/409* (2006.01)
*G05B 23/02* (2006.01)
*G06T 7/262* (2017.01)
*G05B 17/02* (2006.01)

(52) U.S. Cl.
CPC ......... *G05B 19/4069* (2013.01); *G05B 23/02* (2013.01); *G06F 3/0482* (2013.01); *G06T 7/262* (2017.01); *G06T 11/206* (2013.01)

(56) References Cited

U.S. PATENT DOCUMENTS

| | | | | |
|---|---|---|---|---|
| 2004/0075833 | A1* | 4/2004 | Ikeda | G01N 15/0205 356/336 |
| 2004/0129108 | A1 | 7/2004 | Wilson | |
| 2004/0255713 | A1 | 12/2004 | Wilson | |
| 2006/0050302 | A1* | 3/2006 | Sawaguchi | G06F 16/51 358/1.15 |
| 2006/0119026 | A1* | 6/2006 | Ryaboy | F16F 15/10 267/140.15 |
| 2010/0226561 | A1* | 9/2010 | Fujikawa | G06T 7/0002 382/141 |
| 2013/0222391 | A1* | 8/2013 | Tezuka | G06T 11/20 345/440.1 |
| 2015/0084572 | A1* | 3/2015 | Tanaka | G05B 11/36 318/568.1 |
| 2017/0140521 | A1 | 5/2017 | Sakaguchi et al. | |
| 2017/0261950 | A1* | 9/2017 | Mori | G05B 13/042 |
| 2017/0300036 | A1* | 10/2017 | Maeda | G05B 19/0426 |
| 2018/0285395 | A1* | 10/2018 | Luo | G06F 16/2282 |

FOREIGN PATENT DOCUMENTS

| | | |
|---|---|---|
| JP | H6-319284 A | 11/1994 |
| JP | 2008-102714 A | 5/2008 |
| JP | 2010-191939 A | 9/2010 |
| JP | 2011-244668 A | 12/2011 |
| JP | 2012-103827 A | 5/2012 |
| JP | 5175051 B2 | 1/2013 |
| JP | 2013-175073 A | 9/2013 |
| JP | 5416238 B2 | 2/2014 |
| JP | 2017-097426 A | 6/2017 |
| WO | 2013/171875 A1 | 11/2013 |
| WO | 2016/170661 A1 | 10/2016 |

OTHER PUBLICATIONS

English translation of the Written Opinion("WO") of PCT/JP2018/038194 dated Jan. 8, 2019.
Notice of Submission of Publications, etc. dated Oct. 20, 2020 in a counterpart Japanese patent application with a detailed translation.
Notice of Submission of Publications, etc. dated Oct. 20, 2020 in a counterpart Japanese patent application.
Japanese Office Action dated Jan. 19, 2021 for the counterpart Japanese patent application.
Japanese Office Action dated Apr. 6, 2021 for the counterpart Japanese patent application.
Extended European search report (EESR) dated Jun. 25, 2021 in a counterpart European patent application.

* cited by examiner

SERVO MOTOR ADJUSTING DEVICE AND SERVO MOTOR ADJUSTING METHOD

TECHNICAL FIELD

The present invention relates to a servo motor adjusting device and a servo motor adjusting method.

BACKGROUND ART

Conventionally, in the FA (Factory Automation) field, robotics field and the like, a servo control system has been known that controls a motor for driving a controlled object, adopts the position, bearing, attitude and the like of the controlled object as controlled variables, and performs automatic control to follow a desired value. In the servo control system, through a servo motor adjusting device, various parameters (servo parameters) for servo-controlling a motor are adjusted in conformity with the type of the controlled object, the type of a control scheme, the characteristics of the motor for driving the controlled object, and the like.

In a case where PID (Proportional-Integral-Differential) control is adopted as the servo control scheme, values of various gains (speed proportional gain, speed integral gain, position proportional gain, etc.) pertaining to PID control are adjusted as various parameters, through the servo motor adjusting device, for example. Through the servo motor adjusting device, filter characteristics pertaining to the PID control (torque filter characteristics for limiting the output torque of the motor, and notch filter characteristics for suppressing mechanical resonance) and the like are adjusted as various parameters.

In the adjustment of various parameters, for example, the motor is servo-controlled according to preset parameters, and the response characteristics of the motor under the servo control are measured. The servo motor adjusting device, for example, performs FFT (Fast Fourier Transform) analysis based on the measured response characteristics data, and displays the analysis result as a Bode plot on a screen of a display device, such as an LCD (Liquid Crystal Display).

A user of the servo motor adjusting device evaluates a servo control operation according to various preset parameters, on the basis of the FFT analysis result (the frequency characteristics, phase characteristics and the like based on the Bode plot), and of a graph indicating a time series of measurement data or the like displayed on the screen. In the servo control adjustment operation, through a user operation on the servo motor adjusting device, measurement of the response characteristics based on various parameters updated with the evaluation result being reflected therein, and evaluation of the servo control operation based on the measurement result are repeated. Through the adjustment operation described above, the setting conditions of various parameters pertaining to servo control for the motor that drives the controlled object are optimized.

Note that conventional technical documents describing techniques related to the technique described in this specification include the following patent document.

CITATION LIST

Patent Document

[Patent Document 1] Japanese Patent Laid-Open No. 2011-244668

SUMMARY OF THE INVENTION

Technical Problem

During adjustment of servo control, measurement data (various graphs displayed on a display screen, such as of the response characteristics data and the FFT analysis result) is required to be recorded and saved as management materials indicating the adjustment history of various parameters, for example.

A user participating in the adjustment operation, for example, has been copied and inserted on a form various graphs displayed on the display screen of the servo motor adjusting device, and recorded and saved the setting conditions of the various parameters by writing the conditions on the form through an operation input on a keyboard or the like. For saving the measurement data, the user has been input, as a file name, the setting conditions of the various parameters by operating the keyboard or the like, and has been recorded and saved measurement data which the setting conditions has been assigned as the file name.

However, according to the aforementioned method of recording and saving the measurement data, misdescription or erroneous omission of description sometimes occurs during the operation input of the setting conditions of the various parameters. In case misdescription or erroneous omission of description occurs, the adjustment history of the recorded and saved measurement data, or the setting conditions of the various parameters pertaining to the servo control of the motor for driving the controlled object are unclear.

The present invention has been made in view of the problems described above, and has an object to provide a technique of managing measurement data in a servo motor adjusting device that can visualize and record the measurement data in association with the condition set during servo control adjustment.

Solution to Problem

The present invention is exemplified by a servo motor adjusting device.

That is the servo motor adjusting device includes:
means for displaying an adjustment screen of a servo parameter set in a control device of a motor driving a controlled object; means for obtaining a setting condition of the servo parameter adjusted based on display information displayed on the adjustment screen; means for obtaining measurement data on a speed control result or a position control result of the motor driven according to the setting condition, in association with at least the setting condition of the servo parameter; generation means for generating first graph data for displaying, on the adjustment screen, an FFT analysis result based on the measurement data, or change in speed or change in position; and save means for obtaining the setting condition of the servo parameter associated with the measurement data of a generation source of the first graph data, and saving, in a memory unit, at least the obtained setting condition and drawing information in an area where the first graph data is displayed as identical file content, upon occasion of accepting a first operation input to the adjustment screen where the first graph data is displayed.

According to such a configuration, drawing information of the change in speed, change in position, FFT analysis result and the like displayed as graphs on the display screen of the servo motor adjusting device, and the setting condition in the servomotor are automatically saved in association with each other. The setting condition in the servomotor can be clarified as management materials indicating the adjustment history of servo control, and prevent misdescription or erroneous omission of description during an operation input. As a result, the operation efficiency of the user during servo control adjustment can be improved.

In the present invention, the device may further include operation means for performing simulation of response characteristics of the motor, based on the updated setting condition of the servo parameter and the FFT analysis result, wherein the generation means generates second graph data for displaying a result of the simulation on the adjustment screen, and the save means obtains the updated setting condition of the servo parameter, and saves, in the memory unit, at least the obtained updated setting condition and drawing information in an area where the second graph data is displayed as identical file content, upon occasion of accepting the first operation input to the adjustment screen where the second graph data is displayed.

According to such a configuration, also in response characteristics simulation with updated setting condition during servo control adjustment, the drawing information on the simulation analysis result and the updated setting condition can be automatically saved in association with each other. Also in simulation, the management materials with the updated setting conditions being clarified can be saved.

Furthermore, in the present invention, the device may further include first display means for displaying a first sub-window screen displayed on the adjustment screen in an overlapping manner, upon occasion of accepting the first operation input to the adjustment screen where the first graph data or the second graph data was displayed, wherein the save means may insert the obtained setting condition of the servo parameter or the updated setting condition into a predetermined display area in the first sub-window screen, and save, in the memory unit, display information displayed in the first sub-window screen, and the drawing information in the area where the first graph data or the second graph data is displayed as identical file content. According to such a configuration, the user's comment and the like can be reflected in the management materials to be saved. Consequently, improvement in usability can be expected.

Furthermore, according to the present invention, in the file content, a size of an area where information is preliminarily inserted may be fixed. According to such a configuration, the drawing information displayed on the adjustment screen can have the same fixed size, thereby facilitating comparison of graph data items between the saved materials.

Furthermore, according to the present invention, the first display means may designate, as a non-overwritable area, a predetermined area in the first sub-window screen in which at least the setting condition of the servo parameter or the updated setting condition is inserted. According to such a configuration, as for the setting condition, the user's misdescription or erroneous omission of description can be prevented.

Furthermore, according to the present invention, the save means may present, to a file name candidate, information where at least the setting condition of the servo parameter or the updated setting condition is inserted, upon occasion of accepting a second operation input to the adjustment screen where the first graph data or the second graph data is displayed. The save means may assign a name presented to the file name candidate, to the first graph data or the second graph data, and save the data in the memory unit.

According to such a configuration, at least various graph data items can be saved in association with the setting condition. During reading of the saved various graph data items, the setting condition of the servo parameter can be visually identified with reference to the information assigned to the file name. The operability during reading the saved various graph data items can be improved.

Furthermore, according to the present invention, the device may further include adjustment history display means for displaying, on an adjustment history screen, a file name list of one or more first graph data items or second graph data items having previously been drawn on the adjustment screen, upon occasion of a third operation input to the adjustment screen where the first graph data items or the second graph data items are displayed. A file name displayed on the adjustment history screen may be a file name candidate including information where at least the setting condition of the servo parameter of the first graph data or the updated setting condition of the servo parameter of the second graph data is inserted. The adjustment history display means may display the adjustment history screen on the adjustment screen in an overlapping manner. The save means may collectively save, in the memory unit, one or more first graph data items or second graph data items selected from the file name list displayed on the adjustment history screen.

According to such a configuration, the device can select desired data items from among the various data items displayed as graphs on the adjustment screen during the servo control adjustment process, and collectively record and save the selected items, thereby allowing a time period spent for the adjustment operation to be relatively reduced.

Furthermore, according to the present invention, the device may further include second display means for obtaining information included in file name candidates of one or more first graph data items and second graph data items, when the one or more first graph data items and second graph data items assigned the file name candidates and stored in the memory unit are displayed again on the adjustment screen, and displaying the information included in the obtained file name candidates on the adjustment screen in an overlapping manner. The second display means may apply a color to a display frame of the second sub-window screen corresponding to the one or more first graph data items and second graph data items, the color being of a color type of a display color applied to the one or more first graph data items and second graph data items displayed again on the adjustment screen.

According to such a configuration, each graph data item displayed again on the adjustment screen, and the information assigned as the file name to the corresponding graph data item can be visually identified in the same color. The setting conditions of the various parameters can be relatively compared with each other and evaluated with reference to the graph data items displayed again on the adjustment screen. Accordingly, improvement in operability can be expected.

Furthermore, according to the present invention, the device may further include means for obtaining the setting condition of the servo parameter or the updated setting condition constituting a part of file content serving as a target of file selection, in a case of the file selection of the first graph data item saved as file content having the same setting condition of the servo parameter, or the second graph data item saved as file content having the same updated setting condition, from among one or more files saved in the memory unit, and for displaying at least the obtained setting condition of the servo parameter or the updated setting condition, on a preview screen.

According to such a configuration, when the file saved as same file content with the drawing information and setting condition is selected, a desired file can be selected based on the information displayed on the preview screen. The setting condition of the servo parameter can be visually identified through the preview screen.

Furthermore, according to the present invention, a servo motor adjusting method may cause a servo motor adjusting device to execute:

a step of displaying an adjustment screen of a servo parameter set in a control device of a motor driving a controlled object; a step of obtaining a setting condition of the servo parameter adjusted based on display information displayed on the adjustment screen; a step of obtaining measurement data on a speed control result or a position control result of the motor driven according to the setting condition, in association with at least the setting condition of the servo parameter; a generation step of generating first graph data for displaying, on the adjustment screen, an FFT analysis result based on the measurement data, or change in speed or change in position; and a save step of obtaining the setting condition of the servo parameter associated with the measurement data of a generation source of the first graph data, and saving, in a memory unit, at least the obtained setting condition and drawing information in an area where the first graph data is displayed as identical file content, upon occasion of accepting a first operation input to the adjustment screen where the first graph data is displayed.

Furthermore, according to the present invention, the servo motor adjusting method may cause a servo motor adjusting device may further execute an operation step performing simulation of response characteristics of the motor, based on the updated setting condition of the servo parameter and the FFT analysis result, wherein the generation step generates second graph data for displaying a result of the simulation on the adjustment screen, and the save step obtains the updated setting condition of the servo parameter, and saves, in the memory unit, at least the obtained updated setting condition and drawing information in an area where the second graph data is displayed as identical file content, upon occasion of accepting the first operation input to the adjustment screen where the second graph data is displayed.

Note that the present invention can be specified as a servo motor adjusting device that includes at least some of the pieces of means and processes described above. The pieces of means and processes described above can be freely combined and implemented unless a technical contradiction occurs.

Advantageous Effects of the Invention

According to the present invention, a measurement data management technique capable of visualizing and recording measurement data in association with the condition set during servo control adjustment can be provided.

MODE FOR CARRYING OUT THE INVENTION

Figure 1:
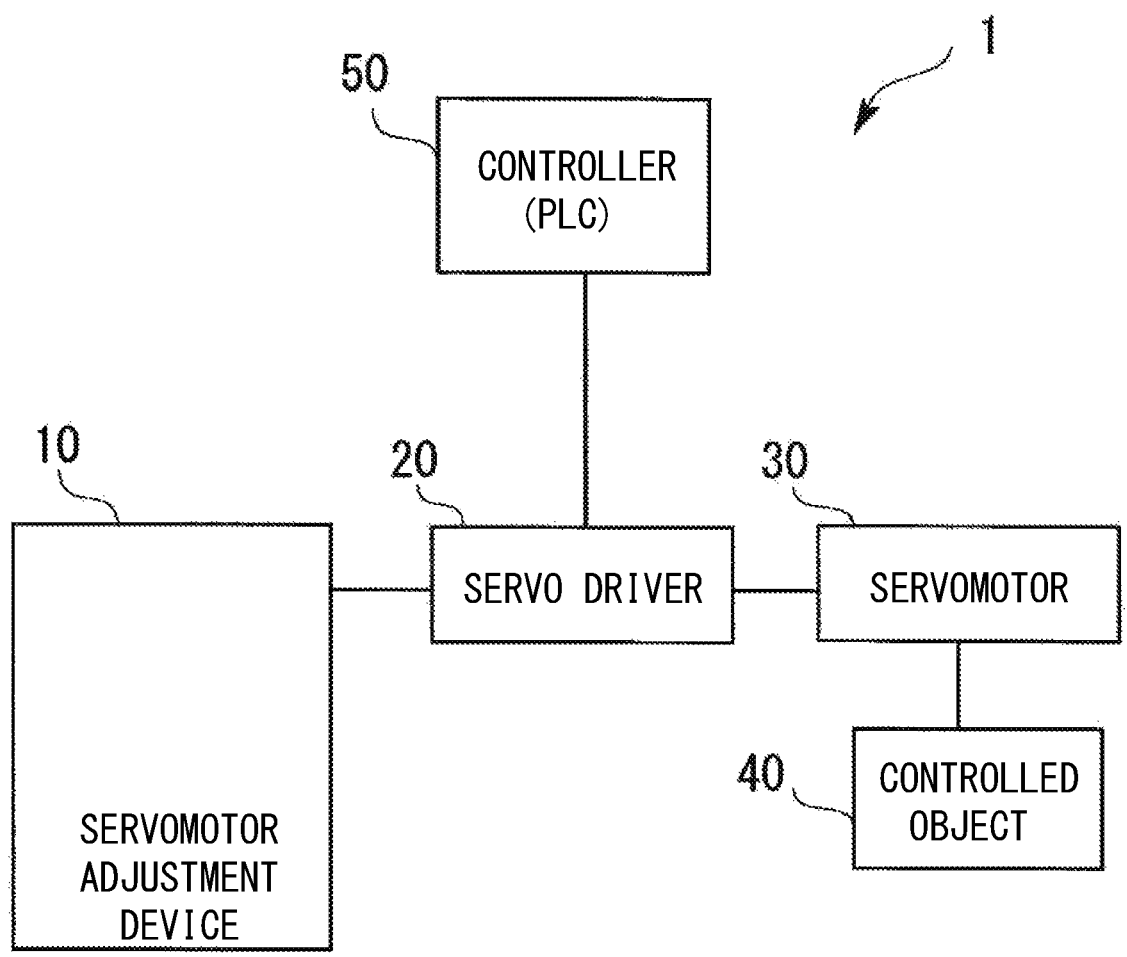
FIG. 1 illustrates an configuration example of a servo control system according to an embodiment.

Hereinafter, referring to the drawings, a servo motor adjusting device according to an embodiment is described. The configuration of the following embodiment is only an example. This servo motor adjusting device is not limited to the configuration of the embodiment.

<1. Servo Control System> (System Overview)

FIG. 1 illustrates a configuration example of a servo control system 1 that includes a servo motor adjusting device 10 according to this embodiment as a component. The servo control system 1 in FIG. 1 includes a servo motor adjusting device (hereinafter, also simply called "adjustment device") 10, a servo driver 20, a servomotor 30, a controlled object 40 that is driven by the servomotor 30, and a controller 50 (PLC: Programmable Logic Controller). The servomotor 30 includes a sensor (encoder) that detects the speed and position during drive control. Various sensors that detect information serving as triggers for outputting control commands to various switches and the servo driver 20, are connected to the controller 50.

The adjustment device 10 and the servo driver 20 of the servo control system 1 are connected to each other via a communication network in a wired or wireless manner. The servo driver 20 and the controller 50 are connected to each other via EtherCAT (Ethernet for Control Automation Technology, a registered trademark) conforming to IEEE 802.3 Ethernet® standard, for example. The servo driver 20 and the servomotor 30 are communicably connected to each other via a dedicated cable.

In the servo control system 1, through the adjustment device 10, various parameters (servo parameters) for servo control are adjusted to be appropriate in conformity with the type of the controlled object 40, the type of a control scheme, the characteristics of the servomotor 30 for driving the controlled object 40, and the like. The adjusted various parameters are set in the servo driver 20. The servo driver 20 automatically controls the servomotor 30 on the basis of the various parameters with the adjusted setting conditions and of the control command output from the controller 50. The controlled object 40 is controlled, through a power transmission mechanism of the servomotor 30, such that the position, bearing and attitude of the controlled object 40 can follow desired values input as control commands from the controller 50.

Note that the servo driver 20 includes a memory that holds various parameters, and data detected through the sensor of the servomotor 30. During adjustment of servo control, the servo driver 20 performs servo control of the servomotor 30 according to the servo parameters set in a predetermined memory area in the memory, and stores various measurement data items detected through the sensor, in a memory area different from the memory area described above. The servo driver 20 stores, in the memory, for example, the speed of the servomotor 30 speed-controlled according to the servo parameters, as measurement data detected for a predetermined time period at a constant periodic interval, for example, 100 μs. The measurement data stored in the memory is obtained by the adjustment device 10 via the communication network.

(Adjustment Device Configuration)

Figure 2:
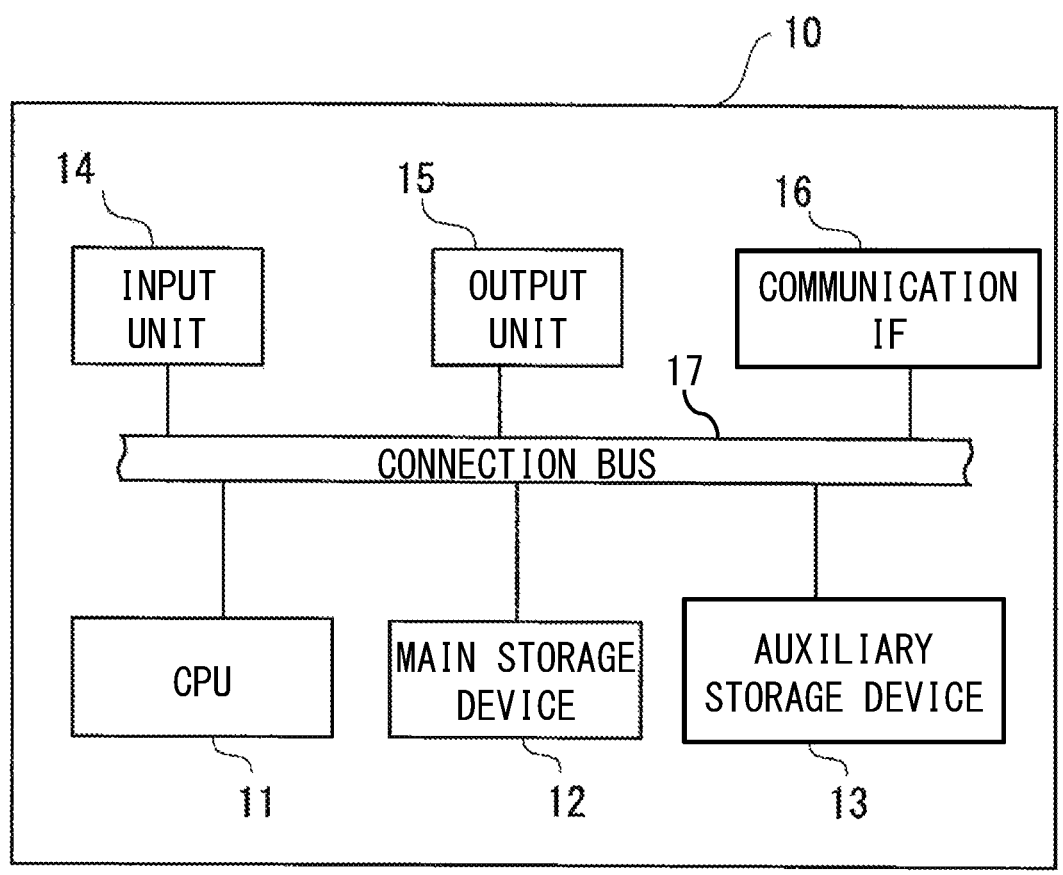
FIG. 2 illustrates a hardware configuration example of a servo motor adjusting device.

FIG. 2 illustrates an example of a hardware configuration of the adjustment device 10 according to this embodiment. As exemplified in FIG. 2, the adjustment device 10 is configured as a computer including a CPU (Central Processing Unit) 11, a main memory 12, an auxiliary memory 13, an input unit 14, an output unit 15, and a communication IF 16, which are connected to each other by a connection bus 17. The main memory 12 and the auxiliary memory 13 are recording media that allow the adjustment device 10 to read. The adjustment device 10 causes the CPU 11 to executably deploy programs stored in the auxiliary memory 13, in a work area of the main memory 12, and to control peripheral devices through execution of the programs, thereby providing functions in conformity with a predetermined object. Note that the configuration elements described above may be redundantly provided, and some configuration elements are not necessarily provided.

The CPU 11 is a central processing unit that controls the entire adjustment device 10. The CPU 11 is also called an MPU (Microprocessor), or a processor. Note that the CPU 11 is not limited to a single processor. A multiprocessor configuration may be adopted instead. Alternatively, a single CPU 11 connected through a single socket may have a multicore configuration. The CPU 11 executes processes according to the programs stored in the auxiliary memory 13.

The main memory 12 is a memory medium where the CPU 11 caches programs and data, and deploys a work area. The main memory 12 includes, for example, a flash memory, a RAM (Random Access Memory), and a ROM (Read Only Memory). The auxiliary memory 13 is a memory medium that stores programs (including an OS (Operating System)) executed by the CPU 11, and setting information on operations. The OS includes a communication interface program that exchanges data with devices connected via the communication IF 16, for example. The auxiliary memory 13 is, for example, an HDD (Hard-disk Drive), an SSD (Solid State Drive), an EPROM (Erasable Programmable ROM), a flash memory, a USB memory, an SD (Secure Digital) memory card or the like.

The input unit 14 accepts an operation instruction from an operator. The input unit 14 is, for example, input devices that include a keyboard, and a pointing device, such as a touch panel or a mouse. The output unit 15 outputs data and information processed by the CPU 11, and data and information stored in the main memory 12 and the auxiliary memory 13. The output unit 15 includes, for example, a display device such as an LCD (Liquid Crystal Display), an EL (Electroluminescence) panel or an organic EL panel, and an output device such as a printer. The communication IF 16 is an interface with a communication network or the like connected to the adjustment device 10.

Note that among the processes executed in the adjustment device 10, at least some processes may be provided by a DSP (Digital Signal Processor), an ASIC (Application Specific Integrated Circuit) or the like. At least some of the processes may be an FPGA (Field-Programmable Gate Array), an numerical processor, a vector processor or a dedicated LSI (large scale integration) such as an image processor, or other digital circuits. Some of the processes may include those processed by analog circuits. The adjustment device 10 includes the auxiliary memory 13 that the CPU 11 or the like refers to during execution of the processes or manages, or as a storage destination of data.

(Function Overview)

In the adjustment device 10, for adjustment of various parameters set in the servo driver 20, a program for adjusting the various parameters through a user operation is activated. Accompanied by activation of the program, a parameter adjustment screen is displayed on the display device, such as an LCD, of the adjustment device 10.

A user of the adjustment device 10 performs adjustment, for example, such that through the parameter adjustment screen, the values of various gains pertaining to PID control (the speed proportional gain, the speed integral gain, the position proportional gain, etc.) can be appropriate in conformity with the response characteristics pertaining to the servo control of the motor. Likewise, adjustment is performed such that the filter characteristics pertaining to PID control (torque filter characteristics for limiting the output torque of the motor, and notch filter characteristics for suppressing mechanical resonance) and the like can be appropriate in conformity with the response characteristics pertaining to the servo control of the motor. In the adjustment operation of the servo control, through the parameter adjustment screen of the adjustment device 10, evaluation of the servo control operation according to the various parameters set in the servo driver 20 is performed on the basis of the measurement data and the FFT analysis result based on the measurement data.

In the adjustment operation of the servo control, the adjustment device 10 of this embodiment obtains the setting conditions of the various parameters corresponding to the measurement data when recording and saving the measurement data pertaining to the evaluation of the servo control operation. The adjustment device 10 of this embodiment records and saves the obtained setting conditions of the various parameters in association with the measurement data pertaining to the evaluation of the servo control operation.

For example, the adjustment device 10 temporarily records the setting conditions of the various parameters set in the servo driver 20 through the parameter adjustment screen, in a predetermined area of the main memory 12. The adjustment device 10 obtains speed data, position data and the like pertaining to the response characteristics of the servomotor 30 controlled of drive according to the setting conditions of the above various parameters, through the servo driver 20. For example, the adjustment device 10 reads the setting conditions of the various parameters right before recorded in the predetermined area of the main memory 12, upon occasion of accepting the speed data, the position data and the like pertaining to the above response characteristics from the servo driver 20. The adjustment device 10 records the read setting conditions of the various parameters, as a part of content constituting data files of the speed data, the position data and the like pertaining to the above response characteristics.

In the adjustment device 10 of this embodiment, the setting conditions set in the servo driver 20 during evaluation of the servo control operation of the servomotor 30, and the speed data, the position data and the like pertaining to the response characteristics of the servomotor 30 measured according to the setting condition are associated with each other in a one-to-one correspondence, and recorded in a memory area of the same data file.

Note that in the adjustment device 10, the speed data, the position data and the like pertaining to the response characteristics obtained from the servo driver 20 are displayed as graphs representing the temporal change of the speed and the temporal change of the position of the servomotor 30, on the parameter adjustment screen, for example. The FFT analysis result based on the speed data pertaining to the response characteristics is displayed as graphs representing the frequency characteristics and the phase characteristics on Bode plots on the parameter adjustment screen, for example.

For example, when an operation input (an operation input to a GUI (Graphical User Interface) component, and a command operation) for recording and saving the measurement result displayed on the parameter adjustment screen occurred, the adjustment device 10 records and saves the setting conditions of the various parameters together with the drawing information on the measurement result as management information. For example, the adjustment device 10 obtains the setting conditions of the various parameters recorded as a part of the content constituting data files of the speed data, the position data and the like pertaining to the response characteristics, and records and saves the obtained setting conditions together with the drawing information on the measurement result.

Note that the adjustment device 10 may insert the drawing information on the measurement result and the setting conditions of the various parameters onto a template having a predetermined area size, thus generating management information. In the management information, the sizes of areas where the drawing information of various graphs displayed on the adjustment screen and the setting conditions of the various parameters are inserted, can be fixed. Relative comparison and evaluation of the graph of the temporal change of the speed, the graph of the temporal change of the position, the FFT analysis result and the like, which are represented in the management information as pieces of drawing information having the same size, are facilitated.

When recording and saving the FFT analysis result as a datafile (for example, in the "CSV (Comma-Separated Values)" format), the adjustment device 10 may add the setting conditions of the various parameters to the file name, accompanying the FFT analysis result. The adjustment device 10 obtains the setting conditions of the various parameters recorded as a part of the content constituting data files of the speed data, the position data and the like pertaining to the response characteristics, and adds the obtained setting conditions to the file name indicating the above FFT analysis result.

In the adjustment device 10 according to this embodiment, the above processing function is provided as an user interface during adjustment of the servo control. According to the adjustment device 10 pertaining to this embodiment, a management technique of measurement data capable of visualizing and recording the measurement data in association with the condition set during servo control adjustment can be provided.

<2. Processing Example> (Case 1)

Figure 3:
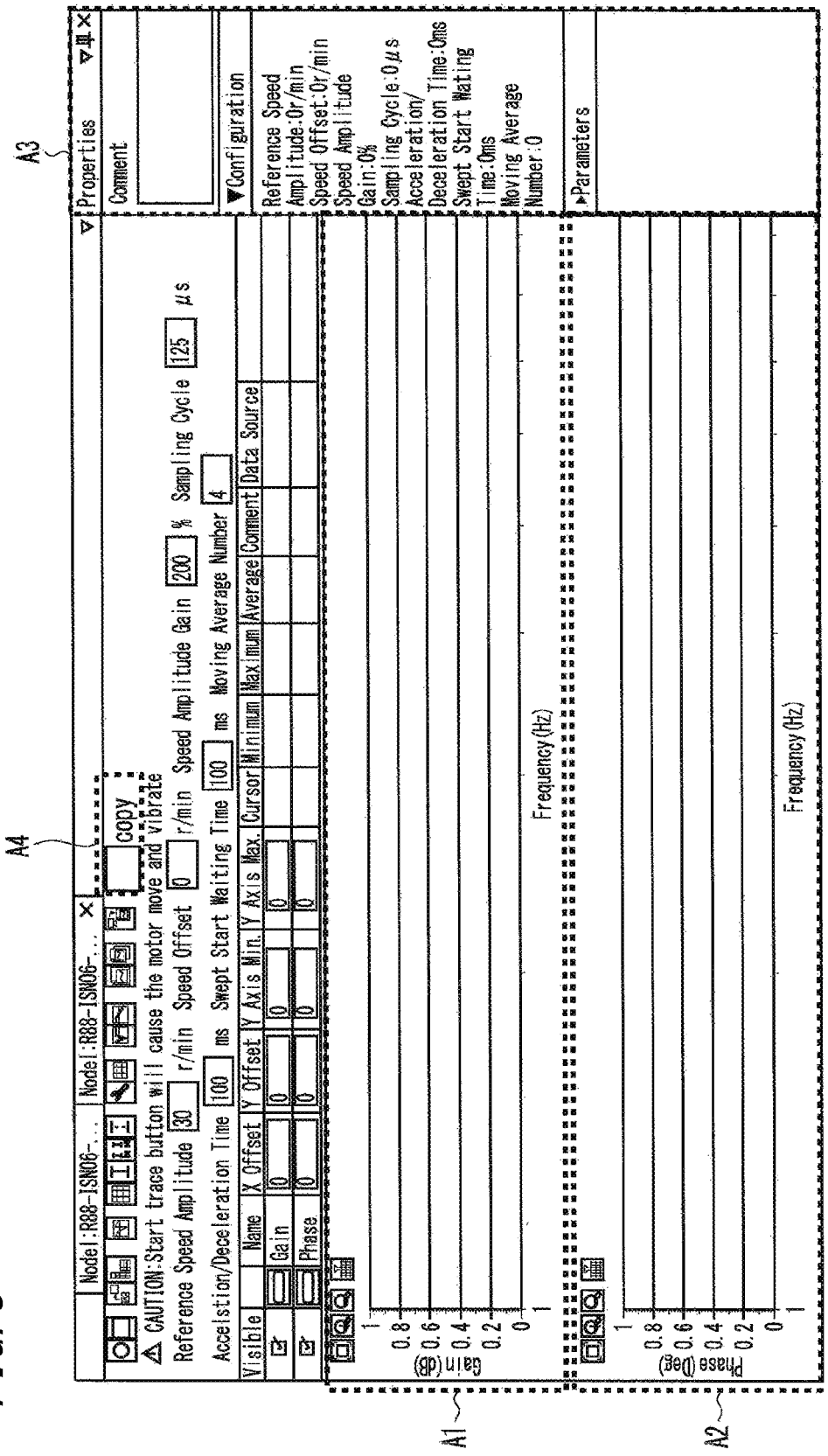
FIG. 3 illustrates an example of an adjustment screen for displaying an FFT analysis result.

Hereinafter, referring to the drawings of FIGS. 3 to 8, the user interface provided by the adjustment device 10 according to this embodiment is described. FIG. 3 illustrates an example of the parameter adjustment screen according to this embodiment. Through the parameter adjustment screen (hereinafter, also called "adjustment screen") exemplified in FIG. 3, various parameters (the values of the speed proportional gain, the speed integral gain, the position proportional gain and the like, the torque filter characteristics, and the notch filter characteristics) pertaining to servo control of the servomotor 30 for the servo driver 20 are set. The conditions of the various parameters set through the adjustment screen are evaluated based on the measurement data displayed as graphs on the adjustment screen.

The adjustment screen exemplified in FIG. 3 is an example of the screen for displaying the FFT analysis result. For example, the adjustment device 10 performs FFT analysis on the basis of the speed data pertaining to the response characteristics obtained from the servo driver 20, and displays the analysis result as Bode plots in predetermined areas (A1 and A2) on the adjustment screen.

For example, in the area A1 enclosed by a broken-line rectangular frame, the frequency characteristics of the servomotor 30 are displayed, with the ordinate axis indicating the gain (dB) and the abscissa axis indicating the frequency (Hz). Likewise, in the area A2 encircled by a broken-line rectangular frame, the phase characteristics of the servomotor 30 are displayed, with the ordinate axis indicating the phase (°) and the abscissa axis indicating the frequency (Hz).

Referring to FIG. 3, in a case of recording and saving still images of the response characteristics of the servomotor 30 displayed on the screen as management materials indicating the adjustment history, the user performs an operation of pressing a GUI component indicated in an area A4 on the adjustment screen, for example.

Upon occasion of the operation of pressing the GUI component indicated in the area A4, the adjustment device 10 displays a sub-window allowing comment input indicated in an area A3, on the adjustment screen in an overlapping manner. In the sub-window in the area A3, the setting conditions of the various parameters corresponding to the Bode plots displayed in the areas A1 and A2, are displayed. Note that as the setting conditions of the various parameters displayed in the sub-window indicated in the area A3, for example, the conditions set in the servo driver 20 immediately before obtaining the measurement data displayed on the adjustment screen are displayed. For example, the adjustment device 10 may obtain the setting conditions of the various parameters recorded as a part of the content constituting data files of the speed data, the position data and the like pertaining to the response characteristics, and display the obtained setting conditions in the sub-window indicated in the area A3.

Note that, in the servo control adjustment process, simulation of the response characteristics in which the torque filter characteristics and the notch filter characteristics are updated and reflected, can be executed for the FFT analysis result having already been displayed as the measurement result. In such a case, upon occasion of an operation input pertaining to execution of the simulation (for example, the operation of pressing the GUI component indicating execution of simulation, and the like), the adjustment device 10 may obtain the setting conditions of the updated various parameters, and display the obtained setting conditions in the sub-window indicated in the area A3. When the above simulation result is displayed on the adjustment screen, the right before updated setting conditions of the various parameters are displayed with the simulation result on the adjustment screen in an overlapping manner.

Figure 4:
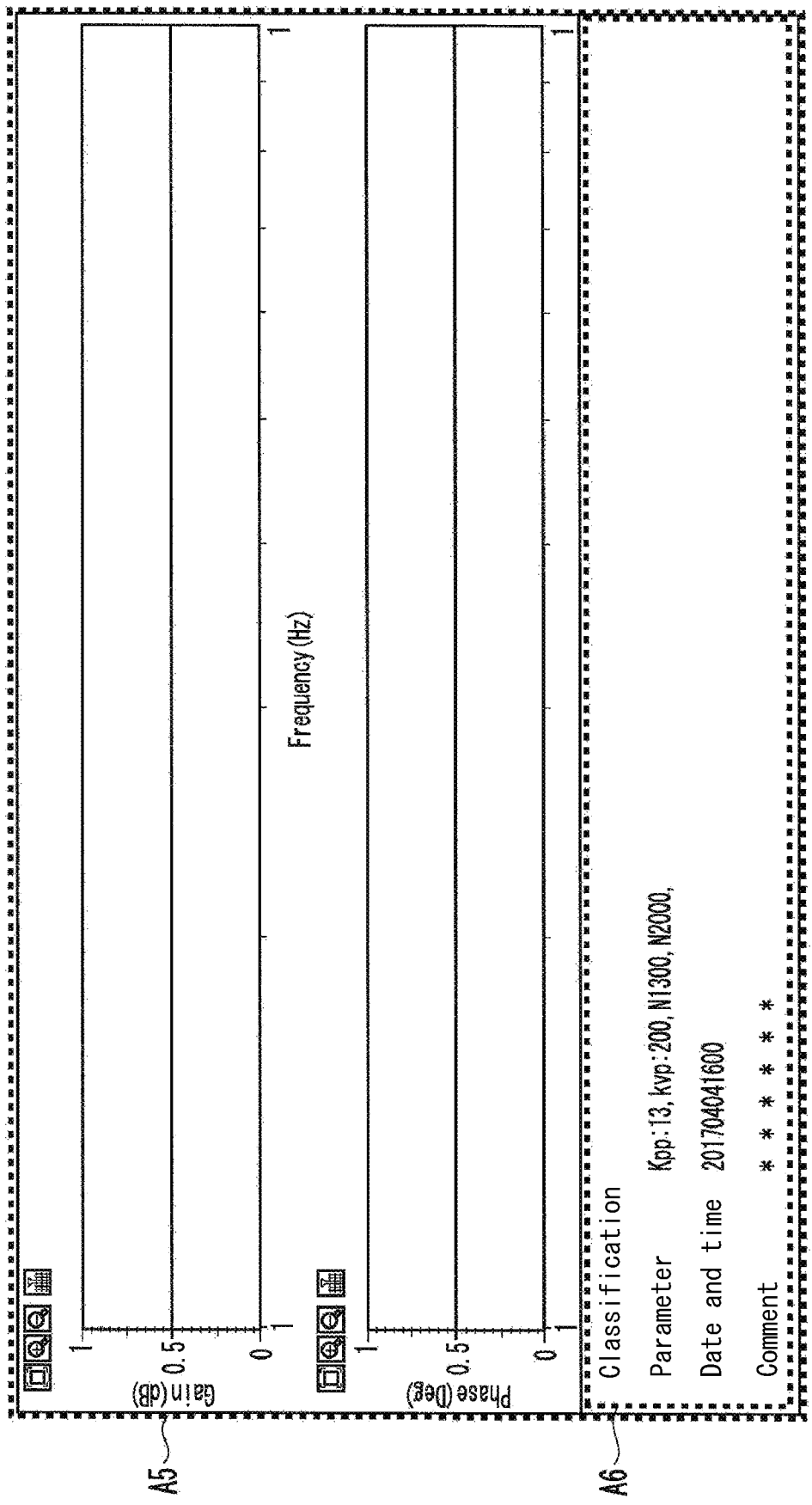
FIG. 4 illustrates an example of recording and saving drawing information on the FFT analysis result.

FIG. 4 illustrates an example of recording and saving of the measurement result displayed on the adjustment screen. As shown in FIG. 4, the FFT analysis result displayed in the areas A1 and A2 and information on the sub-window displayed in the area A3 in FIG. 3 are recorded and saved in a manner capable of being displayed in parallel.

For example, the adjustment device 10 inserts the drawing information on the measurement result displayed on the adjustment screen, and the setting conditions of the various parameters, onto the template having a predetermined area size indicated in FIG. 4, thus generating management information indicating the adjustment history. As shown in FIG. 4, the FFT analysis result displayed in the areas A1 and A2 in FIG. 3 is described in an area A5, and the information in the sub-window displayed in the area A3 is described in an area A6 that is below the area A5, in a manner of being described in parallel in the vertical direction. The drawing information indicating the FFT analysis result in the area A5, and the setting conditions of the various parameters in the area A6 are recorded and saved as consolidated content.

Note that the drawing information inserted in the area A5 is in a drawing portion of the graph data, such as on frequency characteristics and phase characteristics, where the FFT analysis result is displayed. For example, in a case where the measurement result displayed on the adjustment screen is the temporal change in speed, the temporal change in position and the like, the drawing portions of the graph data concerning the change in speed and change in position transitioning over time are inserted in the area A5, accompanied by scale axes, such as the temporal axis, speed axis and position axis.

As shown in FIG. 4, the information in the sub-window in the area A3 in FIG. 3 inserted into the area A6 may be described in association with an item clearly indicating the breakdown of the inserted information. The mode illustrated in FIG. 4 is an example in which the content displayed in the area A3 in FIG. 3 is described in association with each of the items that are "Classification," "Parameter," "Date and time" and "Comment." Such items may be set in conformity with the adjustment details of servo control.

According to the mode in FIG. 4, in "Classification," for example, the name of a device to be adjusted by servo control and the like are described. In "Parameter," the setting conditions of the various parameters pertaining to the drawing information (graph data) inserted into the area A5 is described. In FIG. 4, the position proportional gain condition and the speed proportional gain condition, which are set as the various parameters pertaining to servo control, are described as "Kpp:13" and "kvp:200," respectively. The central frequencies of the notch filter set to suppress the mechanical resonance are described as "N1300" and "N2000."

In "Date and time", time information pertaining to recording and saving of the drawing information inserted into the area A5 is described. The time information includes AD year, month, day, hour, minute, etc. Upon occasion of an operation input to a GUI component, or acceptance of input of a command operation, the adjustment device 10 may obtain the time information, and insert the information into an area indicated by "Date and time." In FIG. 4, "201704041600" is described in "Date and time." A user comment input through an operation of the keyboard and the like is inserted into "Comment".

The item information in the area A6 may be described in a text format, for example. Note that content encompassing the areas A5 and A6 may be generated in an XML (Extensible Markup Language) format, an HTML (HyperText Markup Language) format, a rich text format, etc. Among the items inserted into the area A6, at least "Parameter" and "Date and time" may be defined as areas where overwriting by the user's operation input is prohibited. By describing these items in the areas where overwriting is prohibited, the adjustment device 10 can suppress misdescription to the setting conditions of the various parameters pertaining to the servo control adjustment and adjustment timing due to an erroneous operation or the like.

Note that during adjustment of the servo control system 1, the adjustment device 10 may obtain identification information (for example, a MAC address (Media Access Control address)) on the servo driver 20 connected via the communication network; the identification information uniquely identifies a communication device. The adjustment device 10 may insert the above obtained identification information into an area designated by "Classification" item in the area A6. The identification information on the servo driver 20 where the setting conditions of the various parameters have been adjusted via the adjustment device 10 can be automatically recorded and saved as an adjustment history.

The adjustment device 10 can insert a device name or the like that is in the servo control system 1 and corresponds to the obtained identification information on the servo driver 20, into the area designated by "Classification" item. For example, the adjustment device 10 preliminarily obtains the identification information on one or more servo driver(s) 20 constituting the servo control system 1, and stores, in the auxiliary memory 13, a table that associates the obtained pieces of identification information with the device names and the like in the servo control system 1. The adjustment device 10 may refer to the table stored in the auxiliary memory 13, identify the device name and the like corresponding to the identification information obtained during adjustment, and insert the name into the area designated by the "Classification" item in the area A6.

Furthermore, for user identification during activation, the adjustment device 10 may insert the authenticated user's registered name and the like into "Comment" item. As user identification, for example, input of a password identifying the user, face authentication, fingerprint authentication, iris authentication and the like are exemplified. The adjustment device 10 preliminarily stores, in the auxiliary memory 13 or the like, an authentication support table or the like that associates information pertaining to user authentication with the user's registered name or the like. The adjustment device 10 may then display, in the sub-window, the user's registered name and the like authenticated with reference to the table. By recording the user's registered name or the like as management information, for example, communication between users participating in the adjustment operation of the servo control system 1 can be facilitated.

Note that The identification information that is on the servo driver 20, uniquely identifies the communication device and is inserted in an area designated by "Classification" item in the area A6, the device name associated with the identification information, and the like may be those in an area where overwriting by the user's operation input is prohibited.

(Case 2)

Figure 5:
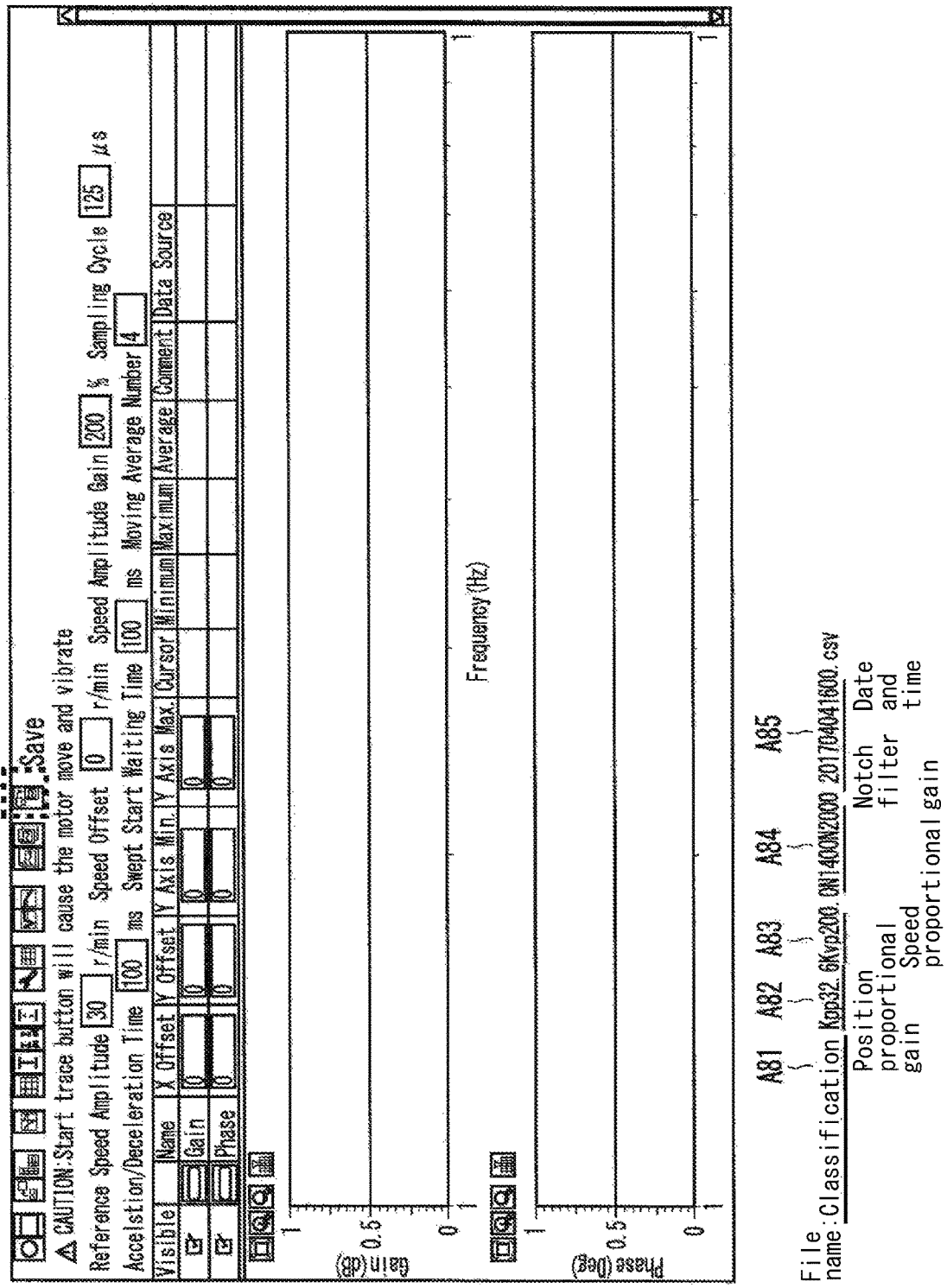
FIG. 5 illustrates saving and recording of data displayed as graphs on the adjustment screen.

FIGS. 5(1) and 5(2) illustrate recording and saving of various data items (the temporal change in speed, the temporal change in position, the FFT analysis result, and the simulation result) displayed as graphs on the adjustment screen. Similar to FIG. 3, the adjustment screen exemplified in FIG. 5(1) is an example of a screen where the response characteristics (the frequency characteristics, and the phase characteristics) of the servomotor 30 are displayed as the FFT analysis result.

In (Case 1), the user interface has been described where the adjustment device 10 records and saves screen data (drawing information) displayed on the adjustment screen together with the setting conditions of the various parameters, on the basis of the user's operation input. Through the user interface in (Case 2), the adjustment device 10 presents the setting conditions as an alternative of the file name, during recording and saving of the various data items (the temporal change in speed, the temporal change in position, the FFT analysis result, and the simulation result) displayed as graphs on the adjustment screen. Note that the various data items displayed as graphs on the adjustment screen are recorded and saved in the CSV (Comma-Separated Values) format, for example.

In FIG. 5(1), the various data items displayed as graphs on the adjustment screen are recorded and saved in the auxiliary memory 13 or the like on the basis of the operation of pressing the GUI component indicated in an area A7 on the adjustment screen or of a predetermined operation input through the keyboard and the like.

Upon occasion of the operation of pressing the GUI component indicated in the area A7, the adjustment device 10 obtains the setting conditions of the various parameters set in the servo driver 20 immediately before obtaining the measurement data displayed on the adjustment screen. For example, the adjustment device 10 obtains the setting conditions of the various parameters, stored as a part of content constituting the data file, of the measurement data obtained via the servo driver 20. The adjustment device 10 then provides the obtained setting conditions of the various parameters, as a file name candidate for recording and saving the various data items displayed as graphs.

During simulation of the response characteristics, upon occasion of an operation input pertaining to execution of the simulation (for example, the operation of pressing the GUI component indicating execution of simulation, and the like), the adjustment device 10 may obtain the setting conditions of the updated various parameters and present the obtained setting conditions as the file name candidate to be recorded and saved.

Note that upon occasion of the operation of pressing the GUI component indicated in the area A7, the adjustment device 10 may display a sub-window allowing comment input indicated in the area A3 in FIG. 3, on the adjustment screen in an overlapping manner. As described with reference to FIG. 4, the item identified as "Parameter", i.e., the setting conditions of the various parameters stored as a part of content constituting the data file of the measurement data and serves as the file name candidate, is displayed on the sub-window.

FIG. 5(2) illustrates an example of the file name candidate including the setting conditions of the various parameters. As shown in FIG. 5(2), the file name candidate of the data pertaining to graph display to be recorded and saved in the CSV format includes at least one or more description areas (A82, A83 and A84) where the setting conditions are listed.

In FIG. 5(2), for example, the position proportional gain condition is described as "kpp32.6" in an area A82. In an area A83 subsequent to the area A82, for example, the speed proportional gain condition is described as "kvp200.0." In an area A84 subsequent to the area A83, for example, the central frequencies of the notch filter set for suppressing the mechanical resonance are described as "N1400N2000."

Note that as shown in FIG. 5(2), the information on "Classification" item described with reference to FIG. 4 may be included in an area A81 preceding to the areas where the setting conditions of the various parameters are listed. Likewise, the information on "Date and time" item described with reference to FIG. 4 may be included in an area A85 subsequent to the areas where the setting conditions of the various parameters are listed. The pieces of information described in the area where the setting conditions of the various parameters are listed, the area A81 and the area A85 are concatenated to each other with predetermined identification symbols (for example, "_," "&," etc.) such that the information included in the file name can be identified, for example.

Note that as described with reference to FIG. 4, in a case where identification information uniquely identifying the communication device of the servo driver 20 can be obtained, the pieces of information listed in the areas A81 to A85 (classification information, setting conditions of the various parameters, and date and time information) are collectively recorded and saved. The classification information, and the date and time information are included in the file name candidate presented by the adjustment device 10 in advance. Accordingly, misdescription or erroneous omission of description through a user's operation input can be suppressed.

In the file name candidate exemplified in FIG. 5(2), at least the content described in the areas A82 to A85 may be non-overwritable areas, while the area A81 may be an overwritable area. The file name candidate of the data pertaining to the graph display recorded and saved in the CSV format may be reflected so as to include the setting conditions of the various parameters presented through the user interface provided by the adjustment device 10.

(Case 3)

During servo control adjustment, simulation of the response characteristics in which the torque filter characteristics and the notch filter characteristics are updated and reflected to the FFT analysis result already displayed on the adjustment screen as a measurement result, is repeated in some cases. For example, when the simulation result indicates favorable response characteristics, the user sets, in the servo driver 20, various parameters in which the updated filter characteristics are reflected, and measures the response characteristics. The FFT analysis result of the measured response characteristics is compared with the simulation result, and the setting conditions of the various parameters are relatively evaluated. When the simulation result indicates unintentional response characteristics, the filter characteristics and the like are updated again, and simulation based on the updated filter characteristics is repeated.

Accordingly, for example, the adjustment device 10 may temporarily accumulate, as an adjustment history, a history of data pertaining to graph display corresponding to the various parameters pertaining to servo control, and provide a user interface that presents the accumulated adjustment history on the adjustment screen. The data pertaining to graph display accumulated as the adjustment history is assigned the predetermined file name described in (Case 2) and is temporarily stored in a predetermined area of the main memory 12. The adjustment device 10 may then record and save various data items pertaining to graph display (the temporal change in speed, the temporal change in position, the FFT analysis result, and the simulation result) selected from the adjustment history by the user.

Figure 6:
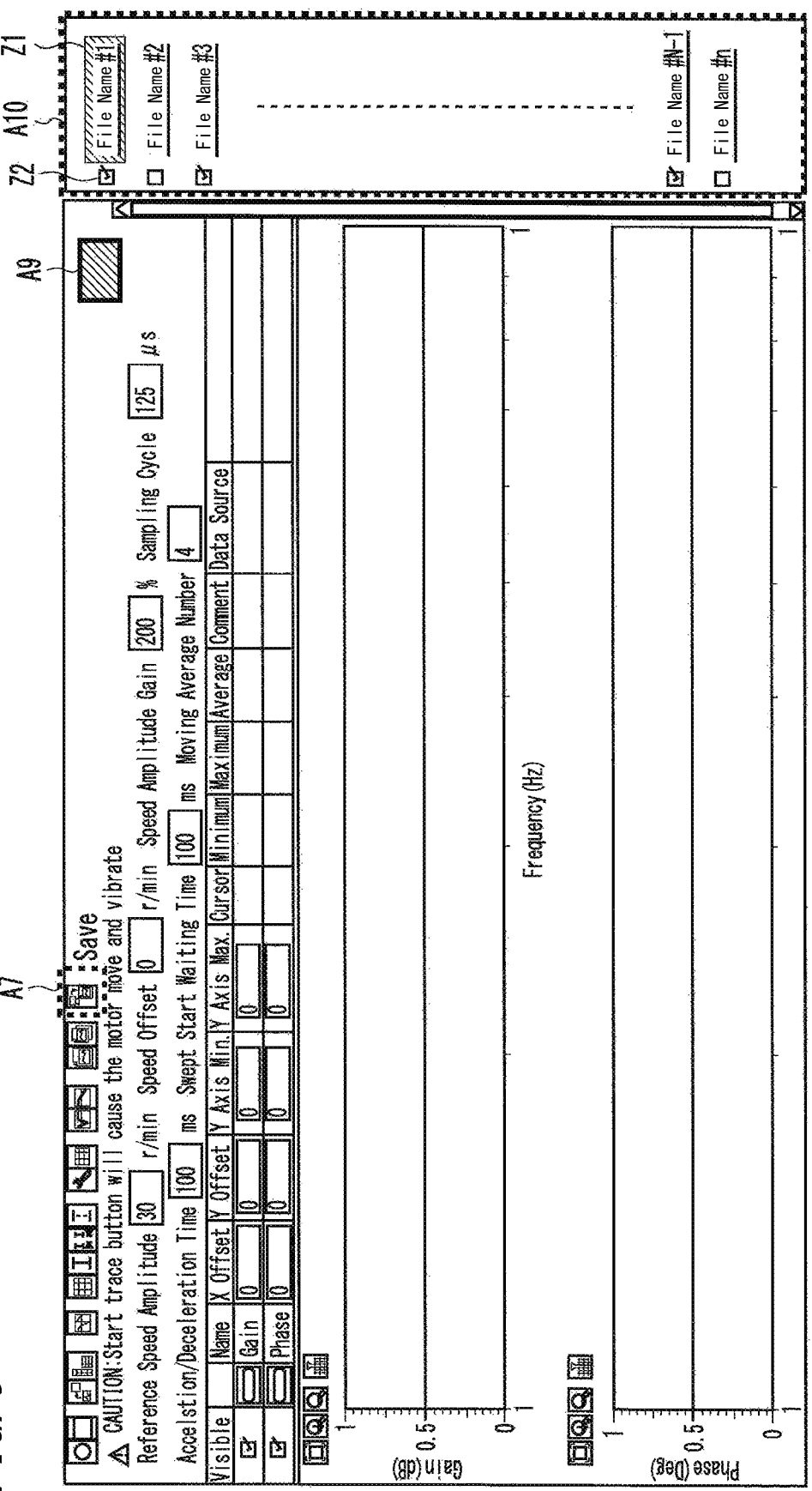
FIG. 6 illustrates saving and recording of data pertaining to graph display using an adjustment history.

FIG. 6 illustrates saving and recording of the various data items pertaining to graph display based on the adjustment history. Similar to FIG. 3, the adjustment screen exemplified in FIG. 6 is an example of a screen where the response characteristics (the frequency characteristics, and the phase characteristics) of the servomotor 30 are displayed as the FFT analysis result.

As illustrated in FIG. 6, the adjustment device 10 includes an area A9 provided with a GUI component for displaying the adjustment history of various data items displayed as graphs on the adjustment screen. Upon occasion of the operation of pressing the GUI component indicated in the area A9, the adjustment device 10 displays a sub-window indicated in an area A10, on the adjustment screen in an overlapping manner.

For example, upon occasion of an operation input pertaining to graph display of the measurement data obtained via the servo driver 20, the adjustment device 10 temporarily stores the data pertaining to graph display of the processing target in the CSV format in the predetermined area of the main memory 12. Here, the operation inputs pertaining to the graph display of the measurement data are, for example, the user's time-series display (speed and position) operation, FFT analysis execution operation, simulation execution operation and the like on the adjustment screen. The adjustment device 10 assigns the file name described with reference to FIGS. 5(1) and 5(2) to the data pertaining to graph display of the processing target, and accumulates the data assigned the file name. Note that the assigned file name includes at least the setting conditions of the various parameters listed in the areas A82 to A84 in FIG. 5(2), and the time information indicated in "Date and time" item in the area A85.

Upon occasion of an operation of pressing the GUI component indicated in the area A9, the adjustment device 10 obtains the file name of the data pertaining to graph display accumulated as the adjustment history in the main memory 12. The adjustment device 10 chronologically arrays the obtained file names on the basis of the time information included in the file names, and displays the file names as a list in the sub-window indicated in the area A10. For example, the file name list of one or more data items displayed as graphs on the adjustment screen in the adjustment process is chronologically displayed as the adjustment history in the sub-window.

As indicated in the area A10, the file names displayed as the list in the sub-window are provided with radio buttons Z2, respectively. In the adjustment device 10, by making the radio buttons Z2 provided for the respective file names "enabled", the data pertaining to graph display to be recorded and saved, from the file name list displayed as the adjustment history is selected.

The user operates the cursor or the like on the adjustment screen, for example, overlays the cursor or the like on the display area of the radio button Z2 of the file name to be recorded and saved, and performs a click operation or the like, thereby making the radio button Z2 "enabled". Upon occasion of a predetermined operation input (for example, an operation of pressing the GUI component for executing "collectively save"), the adjustment device 10 collectively saves, in a predetermined area of the auxiliary memory 13, data on one or more file names corresponding to the radio buttons Z2 made "enabled" in the adjustment history.

In the example in FIG. 6, for example, at least graph data corresponding to the "File name #1," "File name #3" and "File name #N−1" with the radio buttons Z2 being made "enabled" is collectively saved. The adjustment device 10 can select desired data items from among the various data items displayed as graphs on the adjustment screen during the servo control adjustment process, and collectively record and save the selected items, thereby allowing a time period spent for the adjustment operation to be relatively reduced.

Note that when a predetermined operation is performed for the file name in the adjustment history displayed in the area A10, the adjustment device 10 may read, from the main memory 12, data pertaining to graph display identified by the file name, and display the data on the adjustment screen. The predetermined operation is, for example, an operation of pressing "ENTER" key or the like, the operation being performed in a state where the cursor or the like is overlaid on the file name displayed as the adjustment history.

In FIG. 6, for example, the adjustment device 10 detects the cursor overlaid on the area where "File name #1" in the area A10 is described, and accepts the predetermined operation, such as the operation of pressing the "ENTER" key or the like in the overlaid state. For example, upon occasion of accepting the predetermined operation, the adjustment device 10 displays the file name of the operation target in a highlighted manner as indicated in a hatched area Z1 having a rectangular frame. The adjustment device 10 then reads data pertaining to graph display corresponding to "File name #1" stored in the main memory 12, and performs graph display on the basis of the read data. Graphs of the data item corresponding to the file name selected from among the data items pertaining to the graph display accumulated as the adjustment history are displayed on the adjustment screen.

The user can refer to the tendency of change of the graph displayed on the adjustment screen, select the file name to be recorded and saved, from the adjustment history, and make the radio button Z2 "enabled". When the simulation is repeated in the servo control adjustment process, the user can select a simulation result indicating favorable response characteristics, except simulation results indicating unintentional response characteristics, to be recorded and saved.

(Case 4)

The adjustment device 10 can display again, in graphs on the adjustment screen, the data items pertaining to graph display assigned the file name and recorded and saved as described in (Case 2) and (Case 3). The user can relatively compare the change in transition on the temporal axis and the change in transition on the frequency axis of the graph data items displayed again on the adjustment screen, and evaluate the setting conditions of the various parameters. In (Case 4), the adjustment device 10 provides the next user interface when displaying again, on the adjustment screen, the data pertaining to graph display recorded and saved in the auxiliary memory 13 or the like.

For multiple graph data items displayed again on the adjustment screen, for example, the adjustment device 10 reads the information assigned as the file name (the classification information, setting conditions of the various parameters, the date and time information and the like exemplified in FIG. 4 and the like), and displays the read information with the above graph data items on the adjustment screen. When displaying the information assigned as the file name on the adjustment screen, the adjustment device 10 identifies the information assigned as the file name, by the same type of coloration as the color type applied to the graph, for example. Each graph data item displayed again on the adjustment screen, and the information assigned as the file name to the corresponding graph data item can be visually identified according to the same color. Consequently, improvement of the operability of the operation of relatively comparing and evaluating the setting conditions of the various parameters by the user can be expected.

Figure 7:
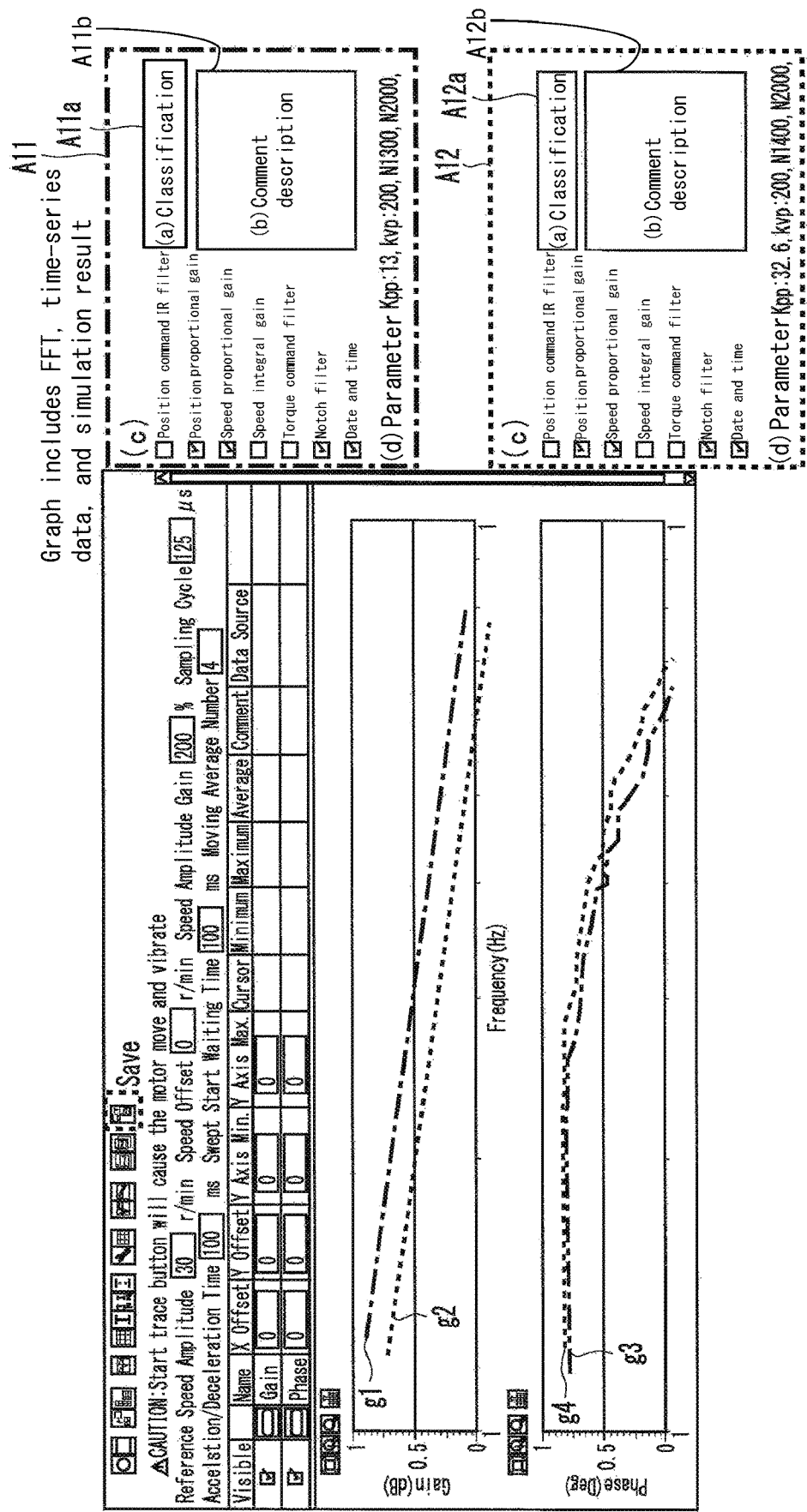
FIG. 7 illustrates a user interface pertaining to graph display.

FIG. 7 illustrates a user interface in (Case 4). The adjustment screen exemplified in FIG. 7 is an example of a screen where the FFT analysis result of the recorded and saved response characteristics (the frequency characteristics, and the phase characteristics) of the servomotor 30 are displayed again.

In the adjustment screen in FIG. 7, a graph g1 on the Bode plot indicating the frequency characteristics, and a graph g3 on the Bode plot indicating the phase characteristics represent the FFT analysis result of the response characteristics based on the measurement data on the various parameters set according to one condition. Likewise, a graph g2 on the Bode plot indicating the frequency characteristics, and a graph g4 on the Bode plot indicating the phase characteristics represent the FFT analysis result of the response characteristics based on the measurement data on the various parameters set according to a condition different from the one condition described above.

Note that on the adjustment screen, the graph g1 and the graph g3 are represented in the same color, and the graph g2 and the graph g4 are represented in the same color. Coloration is performed such that the color type (for example, red) applied to the graph g1 is different from the color type (for example, blue) applied to the graph g2.

When reading data pertaining to the response characteristics of the graphs g1 and g3, the adjustment device 10 obtains the information assigned to the file name (the classification information, the setting conditions of the various parameters, the date and time information and the like exemplified in FIG. 4 and the like). Upon occasion of displaying the graphs g1 and g3 on the adjustment screen, the adjustment device 10 displays, for example, a sub-window indicated in an area A11 on the adjustment screen in an overlapping manner, and displays, in the sub-window, adjustment condition information generated based on the obtained information. A similar process is applied also to the graphs g2 and g4, and the adjustment condition information generated based on the information assigned to the file name is displayed on a sub-window indicated in an area A12.

Note that when displaying the sub-window indicated in the area A11 on the adjustment screen in an overlapping manner, the adjustment device 10 obtains the color type (red) applied to the graphs g1 and g3, and applies the obtained color type to the color type of the display frame of the sub-window. Likewise, when displaying the sub-window indicated in the area A12 on the adjustment screen in an overlapping manner, the adjustment device 10 obtains the color type (blue) applied to the graphs g2 and g4, and applies the obtained color type to the color type of the display frame of the sub-window.

In a case where multiple graphs having different setting conditions of the various parameters are displayed on the adjustment screen, sub-windows encircled by display frames having the same colors applied to the respective graphs are displayed in an overlapping manner.

The adjustment device 10 may generate the adjustment condition information displayed in the sub-windows indicated in the respective areas A11 and A12 using a template, for example. Display modes indicated in the respective areas A11 and A12 in FIG. 7 exemplify a template that includes items of "(a) Classification", "(b) Comment description", "(c) Parameter type" and "(d) Parameter". The template is preliminarily stored in the auxiliary memory 13. The details of the items included in the template can be appropriately set in conformity with the adjustment details of servo control and the management mode of the adjustment history.

In "(a) Classification", for example, the name of the device to be adjusted by servo control and the like are displayed. In the display mode in FIG. 7, through the user's operation input on the keyboard or the like, the name and the like described above can be described in the areas A11a and A12a where "(a) Classification" is displayed. Note that in a case where the classification information described in FIG. 5(2) is included in the file name of the data pertaining to graph display, the classification information obtained from the file name is inserted into the areas A11a and A12a.

User comments input into the areas A11b and A12b through the user's operations of the keyboard and the like are inserted into "(b) Comment description". The parameter type included in the file name of the data pertaining to graph display is inserted into "(c) Parameter type". In the display mode in FIG. 7, type items of "Position command IIR filter", "Position proportional gain,", "Speed proportional gain", "Speed integral gain", "Torque command filter", "Notch filter" and "Date and time" are exemplified as parameter types.

Note that in the display mode in FIG. 7, radio buttons are assigned to the respective type items displayed as "(c) Parameter type". The adjustment device 10 sets the radio button of each type item to a selected state (check mark display in FIG. 7) according to the information obtained from the file name of the data pertaining to graph display. According to the selected state of the radio button, the type of information assigned to the file name can be visually identified.

In the display mode in FIG. 7, the radio button of the items of "Position proportional gain", "Speed proportional gain", "Notch filter" and "Date and time" are set in the selected state. The multiple graph data items displayed again on the adjustment screen are relatively compared with each other, and the user evaluating the setting conditions of the various parameters can recognize that the parameter condition in the information assigned to the file name is the type item set in the selected state described above.

The setting conditions of the various parameters obtained from the file name is displayed in "(d) Parameter". Note that in the display mode in FIG. 7, areas where "(c) Parameter type" and "(d) Parameter" are displayed are areas where overwriting by the user's operation input is prohibited.

In the area A11 in FIG. 7, for "(d) Parameter", the position proportional gain is displayed as "Kpp:13," the speed proportional gain is displayed as "kvp:200," and the central frequency of the notch filter is displayed as "N1300" and "N2000". It is indicated that the graphs g1 and g3 of the response characteristics displayed again on the adjustment screen include the parameter conditions displayed in "(d) Parameter" described above in the file name.

In the area A12 in FIG. 7, for "(d) Parameter", the position proportional gain is displayed as "Kpp:32.6", the speed proportional gain is displayed as "kvp:200", and the central frequency of the notch filter is displayed as "N1400" and "N2000". It is indicated that the graphs g2 and g4 of the response characteristics displayed again on the adjustment screen include the parameter conditions displayed in "(d) Parameter" described above in the file name.

Note that in the adjustment device 10, selected state setting of the radio button of each type item of "(c) Parameter type" is performed by identifying words that are "kpp," "kvp," "N" and the like included in the file name. As described with reference to FIG. 5(2), if in the area where the setting conditions of the various parameters are listed, pieces of information in the area concatenated with predetermined identification symbols ("_," "&," etc.) are a series of 12 numerals, such as "201704041600," the adjustment device 10 identifies that "Date and time" information is included in the file name.

In a case where the date and time information is included in the file name of the data pertaining to graph display, the adjustment device 10 may generate the adjustment condition information displayed in the sub-window, using a template including the item such as "(e) Date and time", for example. The adjustment device 10 may insert the date and time information obtained from the file name, into the areas A11*b* and A12*b* where "(b) Comment description" is displayed, and designate the display area of the inserted date and time information as a non-overwritable area.

(Case 5)

According to an modified example of (Case 4), for example, the adjustment device 10 can achieve application to preview display when reading the file of management information recorded and saved in the mode described in (Case 1). As preview display, for example, the setting conditions of the various parameters consolidated with the drawing information on the measurement result displayed on the adjustment screen are obtained through an API (Application Programming Interface) or the like. The obtained setting conditions of the various parameters is then displayed on a preview display screen.

In (Case 5), when reading the management information in the mode of (Case 1) recorded and saved in the auxiliary memory 13 or the like, the adjustment device 10 can present the setting conditions of the various parameters as the preview display indicating the information in the file. In the adjustment device 10, a user interface is provided that refers to the preview display, and facilitates selection of the file satisfying the desired setting conditions from among the files recorded and saved in the auxiliary memory 13 or the like.

Figure 8:
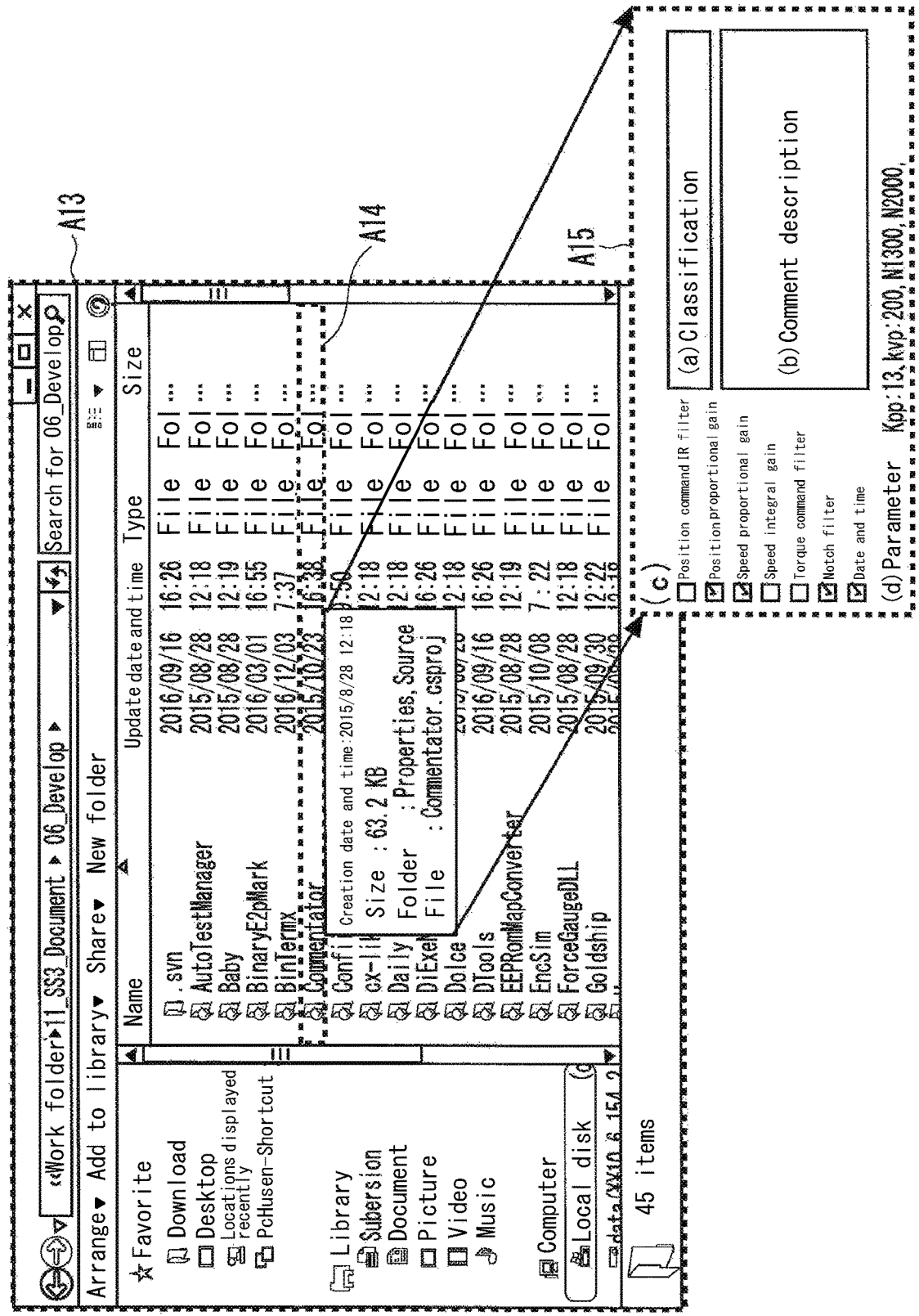
FIG. 8 illustrates a user interface pertaining to preview display.

FIG. 8 illustrates the user interface in (Case 5). In the illustration in FIG. 8, an area A13 represents a display screen for displaying multiple files, folders and the like stored in the auxiliary memory 13 or the like and displayed on the display screen of the adjustment device 10. A file name "Commentator" indicated in an area A14 represents the file of the management information recorded and saved in the mode of (Case 1).

At the file name "Commentator", the drawing information indicating the measurement result described in (Case 1) (for example, the time-series data on the speed and position, the FFT analysis result, and the simulation result), and the setting conditions of the various parameters are recorded and saved as consolidated content.

The adjustment device 10 accepts the user's click operation or the like in a state where the cursor or the like is overlaid on the file name indicated in the area A14, on the display screen indicated in the area A13, for example. Upon occasion of accepting the user operation described above, the adjustment device 10 obtains, through the API, the setting conditions of the various parameters included as the consolidated content in the file indicated in the area A14.

The adjustment device 10 then displays the setting conditions of the various parameters obtained through the API, on the preview display screen indicated in an area A15. On the preview display screen indicated in the area A15, the setting conditions of the various parameters obtained through the API is displayed in the display mode indicated in the areas A11 and A12 in FIG. 7. For example, the adjustment device 10 refers to the template preliminarily stored in the auxiliary memory 13, and generates the preview screen indicated in the area A15 on the basis of the setting conditions of the various parameters obtained through the API. The adjustment device 10 then displays the generated preview screen through the API.

The preview display screen indicated in the area A15 is presented on the display device of the adjustment device 10 where the display screen indicating the multiple files, folders and the like stored in the auxiliary memory 13 or the like was displayed. The user of the adjustment device 10 can refer to the setting conditions of the various parameters displayed on the preview display screen, and select the file including desired management information from among the files, folders and the like.

<3. Flow of Processes>

Figure 9:
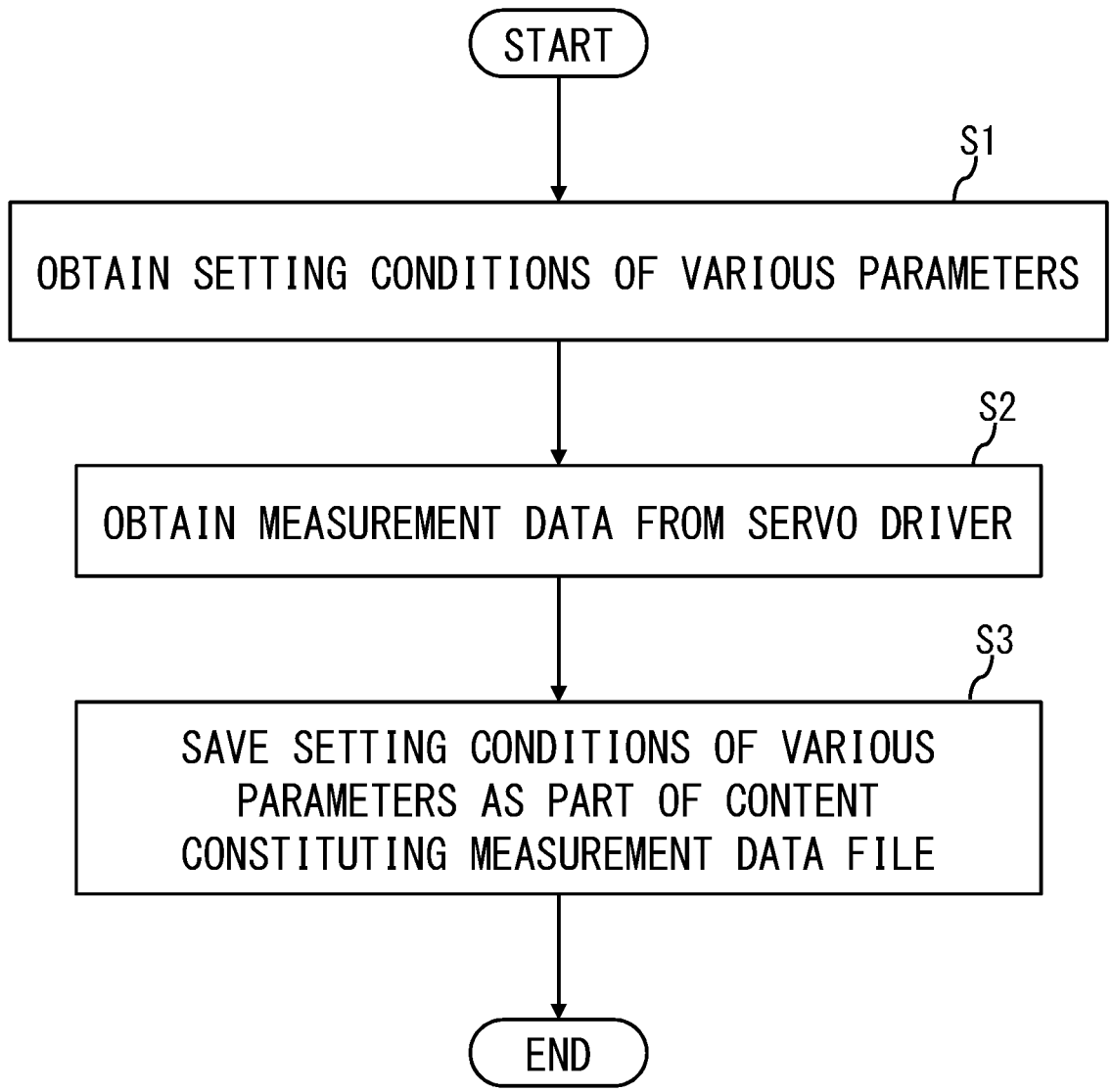
FIG. 9 is a flowchart illustrating an example of a user interface process according to an embodiment.

Next, referring to the drawings of FIGS. 9 to 14, the user interface process according to this embodiment is described. FIG. 9 is a flowchart illustrating an example of a process of obtaining measurement data through the servo driver 20. The adjustment device 10 of this embodiment, for example, provides the user interface process illustrated in FIGS. 9 to 14 by the CPU 11 and the like reading and executing the various programs and various data items stored in the auxiliary memory 13.

In the flowchart of FIG. 9, the start of the process is exemplified as that when various parameters are set in the servo driver 20, for example. For example, the adjustment device 10 sets, in the servo driver 20, various parameter conditions adjusted via the adjustment screen. Upon occasion of setting the various parameters in the servo driver 20, the adjustment device 10 obtains the condition values of the various adjusted parameters (S1). The obtained condition values of the various parameters are temporarily stored in a predetermined area of the main memory 12.

The servo driver 20 controls drive of the servomotor 30 on the basis of the set conditions of the various parameters. The servo driver 20 accumulates the speed and position detected by the servomotor 30, as measurement data in the memory. As for the adjustment device 10, the measurement data accumulated in the memory of the servo driver 20 is obtained by the adjustment device 10 (S2).

Upon occasion of obtaining the measurement data, the adjustment device 10 reads the setting conditions of the various parameters right before recorded in the predetermined area of the main memory 12. The adjustment device 10 records the read setting conditions of the various parameters, as a part of content constituting data files of the measurement data (the speed data, the position data and the like pertaining to the response characteristics) (S3). After the process of S3, the adjustment device 10 finishes the processes in FIG. 9.

According to the above processes, in the adjustment device 10, the setting conditions set in the servo driver 20 during evaluation of the servo control operation of the servomotor 30, and the measurement data pertaining to the response characteristics of the servomotor 30 obtained according to the setting condition are associated with each other, and recorded in a memory area of the same data file.

Figure 10:
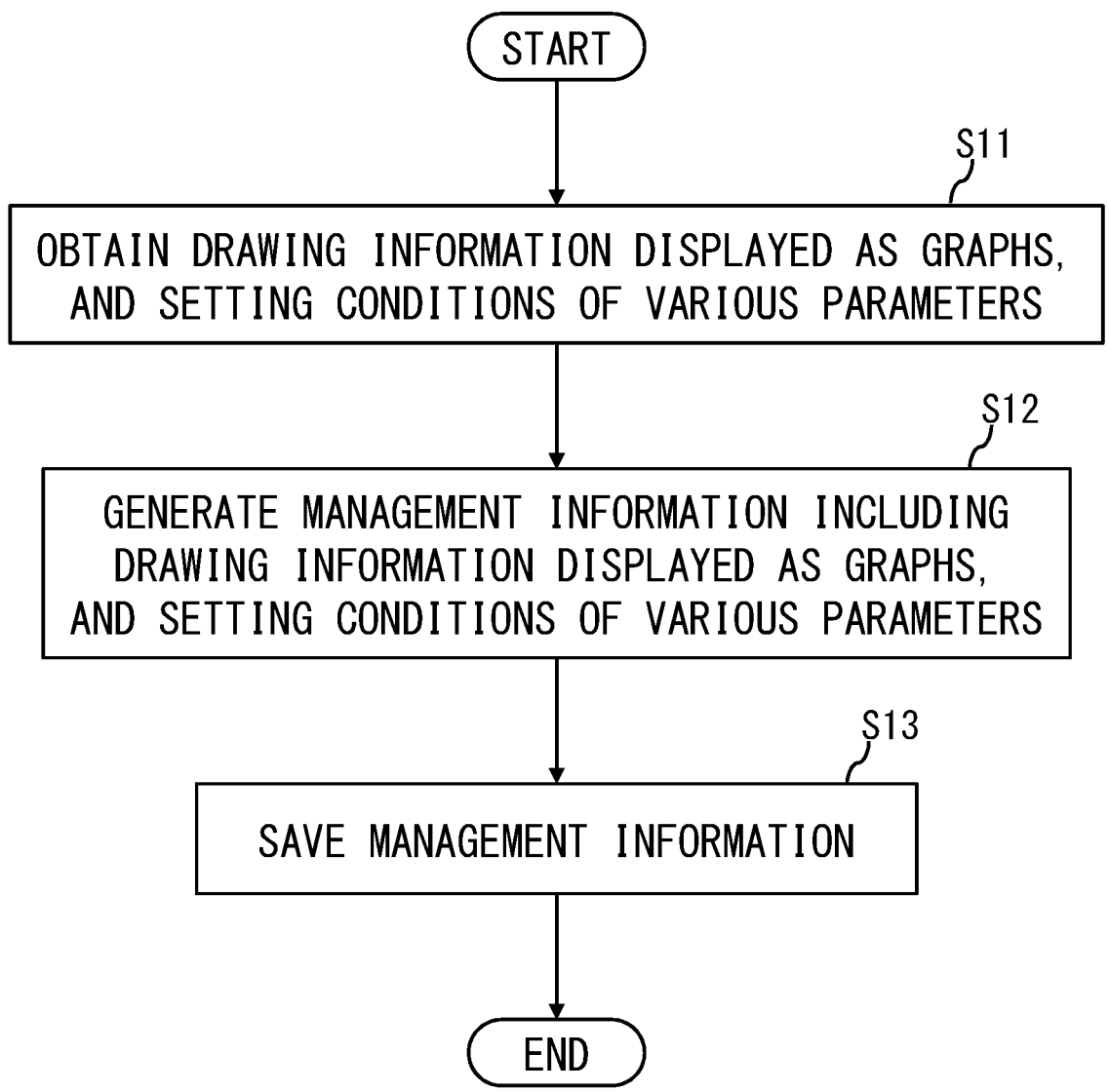
FIG. 10 is a flowchart illustrating an example of a user interface process according to an embodiment.

FIG. 10 is a flowchart illustrating an example of the user interface process in (Case 1). In the flowchart of FIG. 10, start of the process is exemplified as graph display of the obtained measurement data on the adjustment screen, for example.

Upon occasion of a predetermined operation pertaining to recording and saving of a still image displayed as graphs on the adjustment screen (for example, an operation of pressing the GUI component indicated in the area A4 in FIG. 3), the adjustment device 10 obtains the setting conditions of the various parameters stored as a part of content constituting the data file of the measurement data. During simulation, the adjustment device 10 obtains the setting conditions of the various parameters updated during execution of simulation (S11). The obtained setting conditions of the various parameters are displayed on the sub-window on the adjustment screen.

The adjustment device 10 refers to, for example, the template stored in the auxiliary memory 13, and generates management information in which drawing information on the measurement result displayed as graphs on the adjustment screen and the information in the sub-window are inserted and which indicates the adjustment history. During simulation, the adjustment device 10 generates management information in which the drawing information on the measurement result displayed as graphs on the adjustment screen and the information in the sub-window are inserted and which indicates the adjustment history (S12). Note that the generation of the management information has been described with reference to FIG. 4.

The adjustment device 10 stores the generated management information in the auxiliary memory 13 (S13). The drawing information on the measurement result displayed as graphs on the adjustment screen, and the setting conditions of the various parameters at least displayed in the sub-window are recorded and saved, as consolidated content, in the data file. After the process of S13, the adjustment device 10 finishes the user interface process of FIG. 10.

According to the processes described above, in the adjustment device 10 according to this embodiment, the drawing information on the measurement result displayed as graphs on the adjustment screen, and the setting conditions of the various parameters at least displayed in the sub-window are recorded and saved, as content constituting the same file. According to the adjustment device according to this embodiment, as the management materials indicating the adjustment history, the condition set during servo control adjustment is visualized and recorded in association with the graph display data.

By using the template for generating the management information, the sizes of areas where the drawing information on various graphs and the setting conditions of the various parameters displayed on the adjustment screen are inserted, can be fixed. Relative comparison and evaluation of the graph of the temporal change of the speed, the graph of the temporal change of the position, the FFT analysis result and the like, which are represented as pieces of drawing information having the same size in the management information, are facilitated. By standardizing the sizes of the management materials indicating the adjustment history, variation in the size of each user participating in servo control adjustment can be suppressed.

Figure 11:
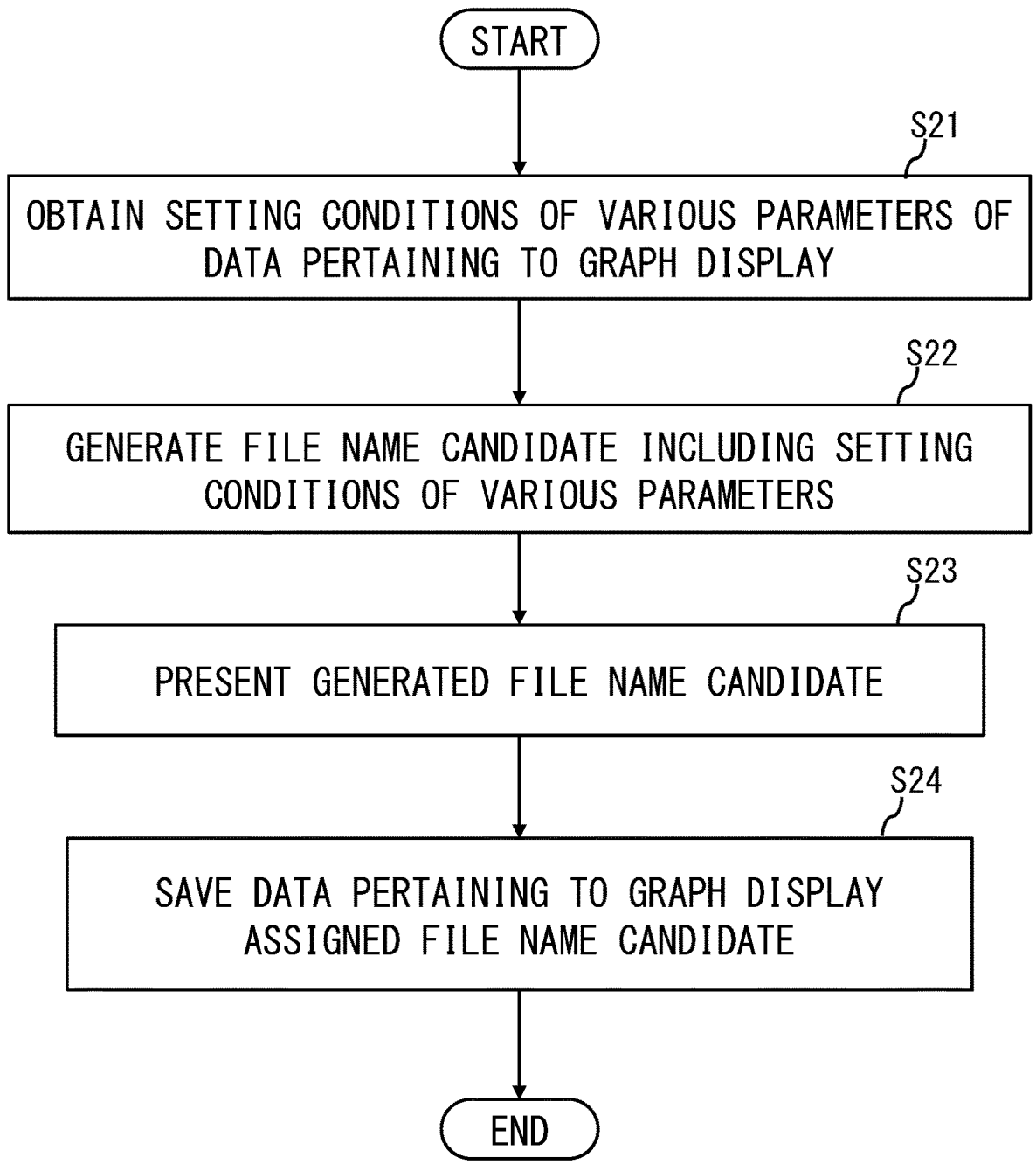
FIG. 11 is a flowchart illustrating an example of a user interface process according to an embodiment.

FIG. 11 is a flowchart illustrating an example of the user interface process in (Case 2). In the flowchart of FIG. 11, start of the process is exemplified as recording and saving data displayed as graphs on the adjustment screen. Upon occasion of a predetermined operation pertaining to recording and saving of data displayed as graphs on the adjustment screen (for example, an operation of pressing the GUI component indicated in the area A7 in FIG. 5(1)), the adjustment device 10 obtains the setting conditions of the various parameters pertaining to graph display (S21).

The adjustment device 10 obtains the setting conditions of the various parameters stored as a part of content constituting the data file of the measurement data pertaining to graph display. During simulation, the adjustment device 10 obtains the setting conditions with the updated various parameters according to execution of simulation.

The adjustment device 10 generates a file name candidate including the obtained setting conditions of the various parameters (S22). The generation of the file name candidate has thus been described with reference to FIG. 5(2). The generated file name candidate is presented to the user referring to the adjustment screen (S23). The adjustment device 10 records and saves the data pertaining to graph display in a predetermined format (for example, the SVC format) in the auxiliary memory 13 on the basis of the file name candidate presented to the user (S24). After the process of S24, the adjustment device 10 finishes the user interface process of FIG. 11.

According to the processes described above, in the adjustment device 10 according to this embodiment, the data displayed as graphs on the adjustment screen is recorded and saved in association with the file name including the setting conditions of the various parameters. The user of the adjustment device 10 can visually identify the setting conditions of the various parameters of the data pertaining to graph display in the file on the basis of the file name. Furthermore, variation in the file name assigned with respect to each user participating in servo control adjustment can be accommodated in a standardized file name format including at least the setting conditions of the various parameters.

Figure 12:
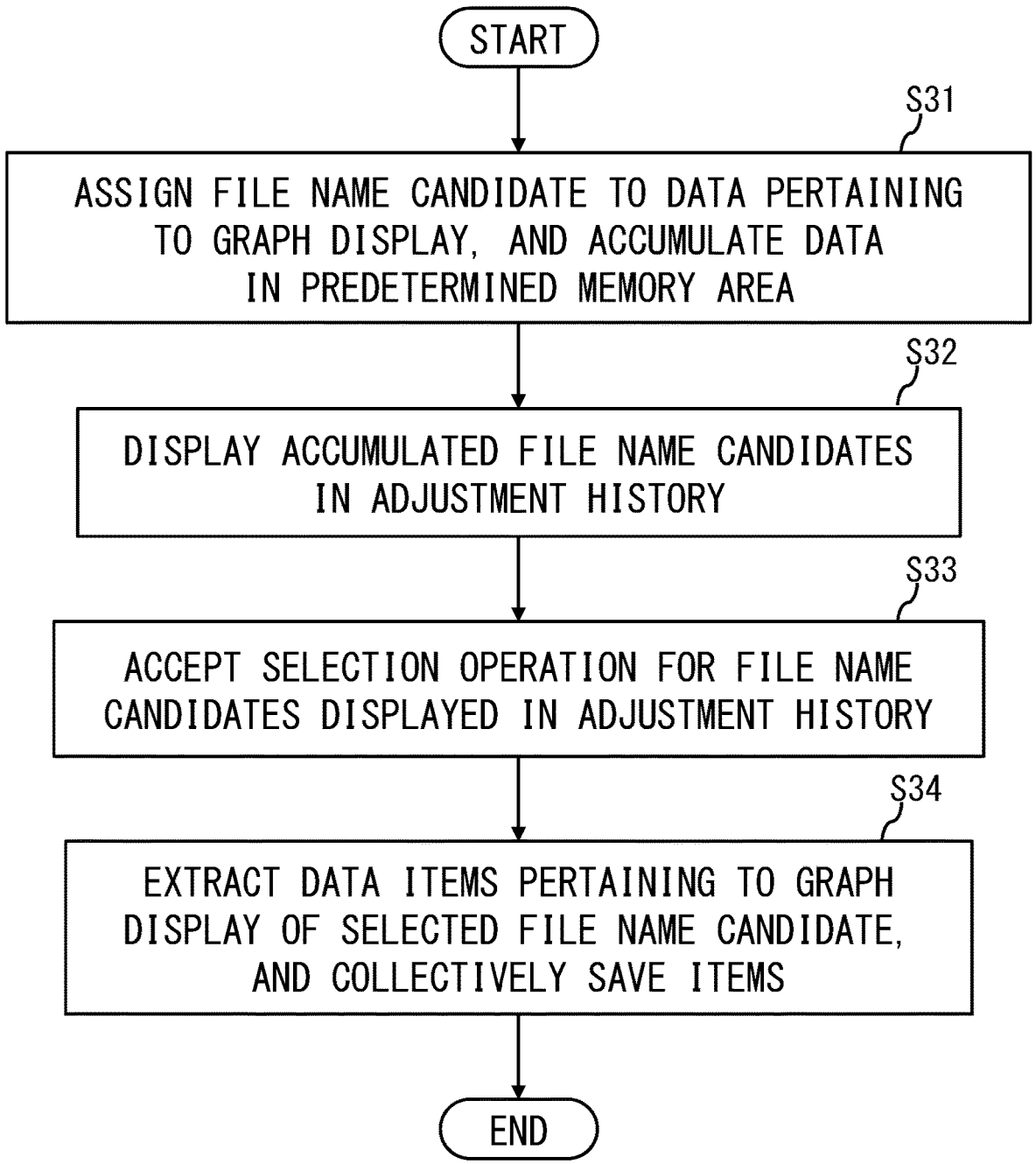
FIG. 12 is a flowchart illustrating an example of a user interface process according to an embodiment.

FIG. 12 is a flowchart illustrating an example of the user interface process in (Case 3). In the flowchart of FIG. 12, start of the process is exemplified as graph display on the adjustment screen. Upon occasion of graph display on the adjustment screen, the adjustment device 10 assigns the file name candidate described with reference to FIG. 5(2) to the data pertaining to graph display, and temporarily stores the data as the adjustment history in a predetermined area of the main memory 12 (S31). In the main memory 12, the data pertaining to graph display stored as the adjustment history is accumulated.

The adjustment device 10 accepts a predetermined operation for displaying the adjustment history, and list-displays the file names corresponding to the data accumulated as the adjustment history in the main memory 12 (S32). The list display of the file names corresponding to the data accumulated as the adjustment history has been described with reference to FIG. 6.

The adjustment device 10 accepts input of a selection operation for the file names displayed as the list (S33). The adjustment device 10 extracts one or more data items corresponding to the file name selected by the user operation from among the file names displayed as the list, and collectively records and stores the items (S34). The data items pertaining to graph display selected from the adjustment history by the user operation are stored in the auxiliary memory 13, with the file name candidates respectively assigned thereto being adopted as the names of data files. After the process of S33, the adjustment device 10 finishes the user interface process of FIG. 12.

According to the processes described above, the adjustment device 10 according to this embodiment can select desired data items from among the various data items displayed as graphs on the adjustment screen during the servo control adjustment process, and collectively record and save the selected items, thereby allowing a time period spent for the adjustment operation to be relatively reduced.

Figure 13:
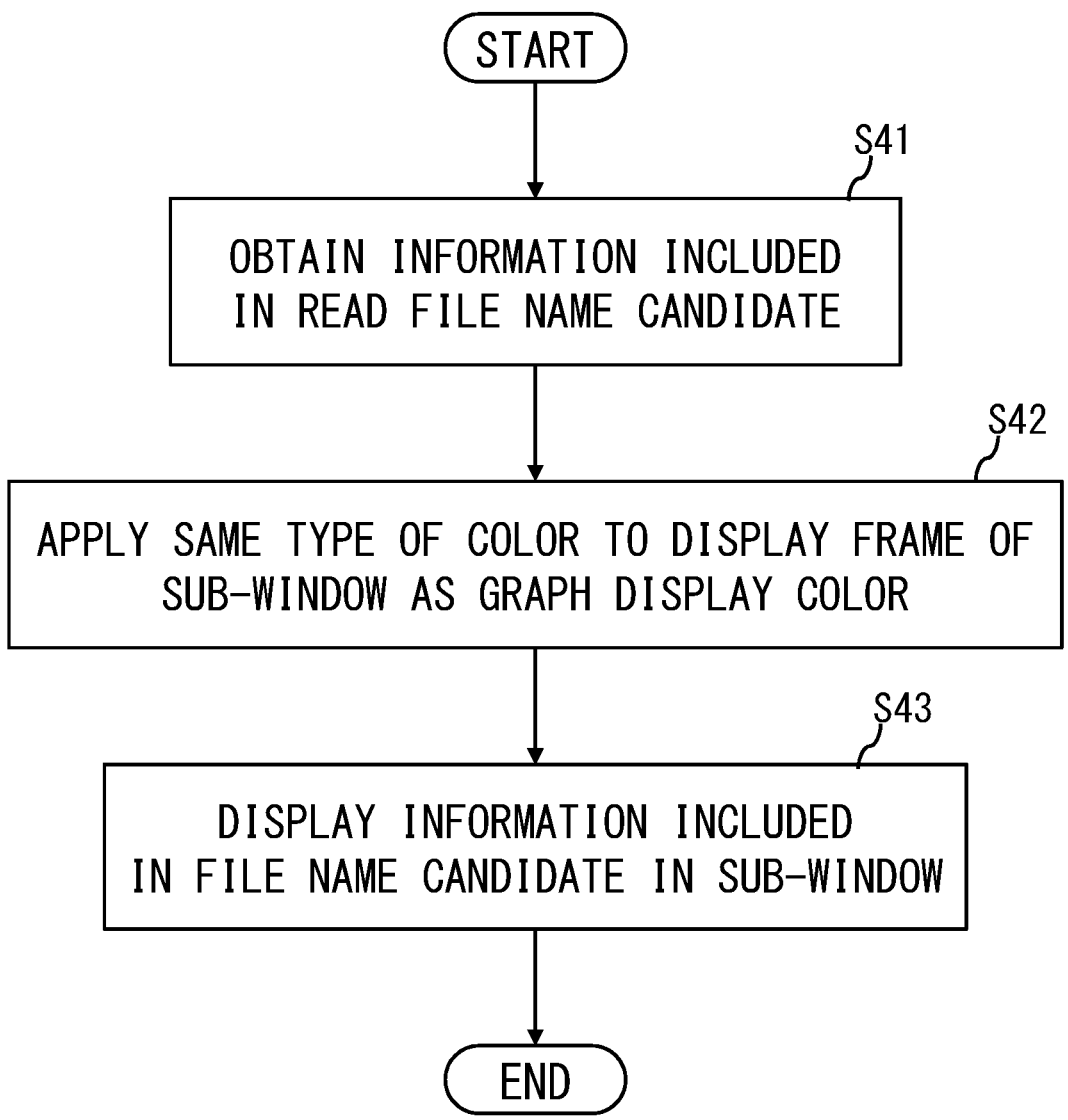
FIG. 13 is a flowchart illustrating an example of a user interface process according to an embodiment.

FIG. 13 is a flowchart illustrating an example of the user interface process in (Case 4). In the flowchart of FIG. 13, start of the process is exemplified as reading of the data pertaining to graph display recorded and saved in the auxiliary memory 13 or the like. Upon occasion of reading the data pertaining to graph display, the adjustment device 10 obtains the information included in the file name (the classification information, the setting conditions of the various parameters, the date and time information and the like exemplified in FIG. 4 and the like) (S41).

The adjustment device 10 displays the sub-window on the adjustment screen using the template preliminarily stored in the auxiliary memory 13, and makes the color type of the display frame of the sub-window the same as the color type with which the data read by the process of S41 is displayed as graphs (S42). The adjustment device 10 then inserts the information obtained in the process of S41 onto the template (S43).

The graph data items displayed again, and the setting conditions of the various parameters corresponding to the respective graph data items are displayed on the adjustment screen in coloration similar to the color types applied to the graph data items. After the process of S42, the adjustment device 10 finishes the user interface process of FIG. 13.

According to the processes described above, in the adjustment device 10 according to this embodiment, each graph data item displayed again on the adjustment screen, and the information assigned as the file name to the corresponding graph data item can be identified in the same color. According to the adjustment device 10 pertaining to this embodiment, the operation of relatively comparing and evaluating the setting conditions of the various parameters by the user participating in the adjustment operation can be facilitated. Accordingly, improvement of the operability can be expected.

Figure 14:
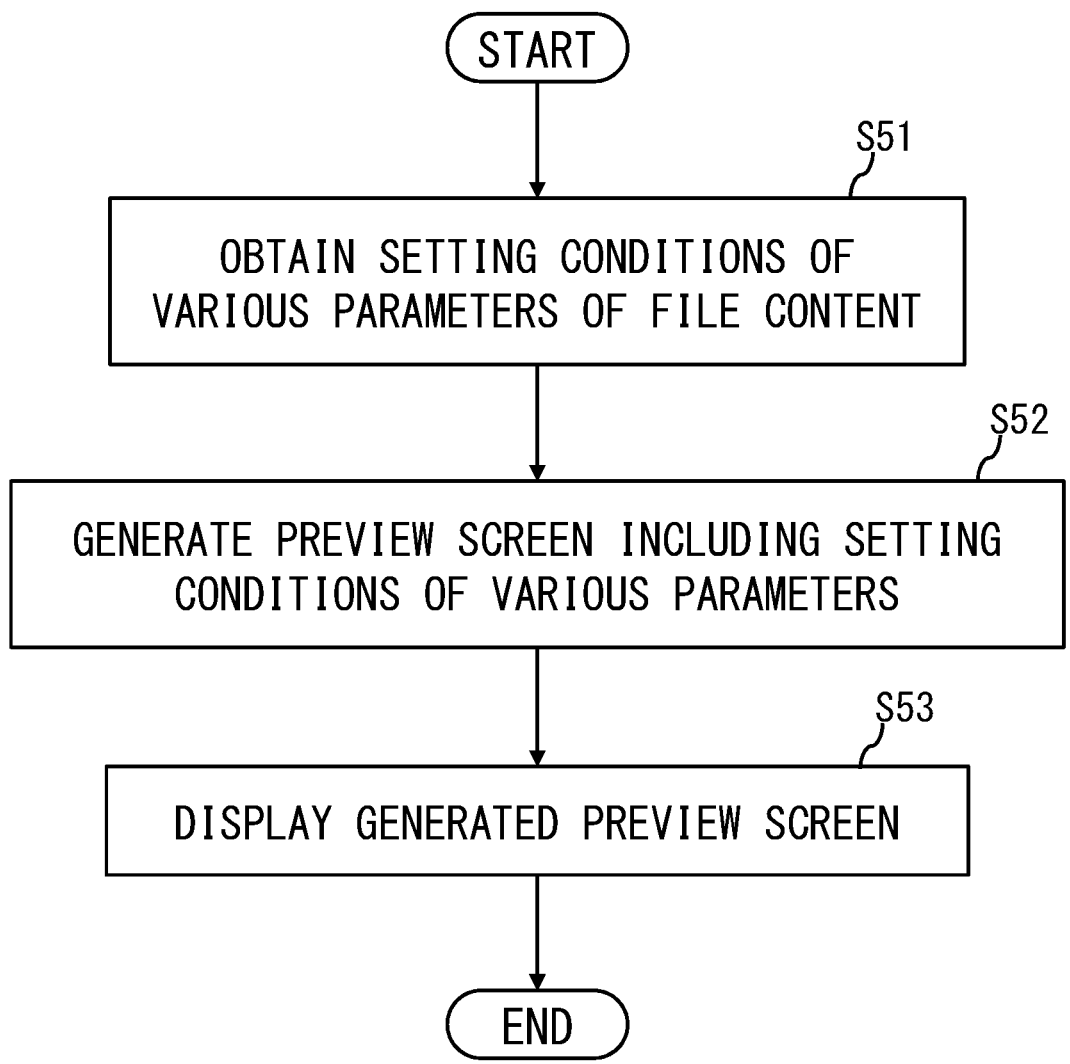
FIG. 14 is a flowchart illustrating an example of a user interface process according to an embodiment.

FIG. 14 is a flowchart illustrating an example of the user interface process in (Case 5). In the flowchart of FIG. 14, start of the process is exemplified as reading of the management information in the mode of (Case 1) recorded and saved in the auxiliary memory 13 or the like.

The adjustment device 10 accepts the user's click operation or the like in a state where the cursor or the like is overlaid on the file name on the display screen for displaying, in a list, the files, folders and the like recorded and saved in the auxiliary memory 13 or the like. The adjustment device 10 obtains the setting conditions of the various parameters included as consolidated content in the data file with respect to the operation target file (S51). The setting conditions of the operation target file are obtained through the API, for example.

The adjustment device 10 refers to the template stored in the auxiliary memory 13, and generates the preview screen on the basis of the setting conditions of the various parameters obtained through the API (S52). The generation of the preview screen has been described with reference to FIG. 8. The adjustment device 10 displays the preview screen generated for the operation target file, on the display screen for displaying, in a list, the files, folders and the like recorded and saved in the auxiliary memory 13 or the like (S53). The generated preview screen is displayed through the API. After the process of S53, the adjustment device 10 finishes the user interface process of FIG. 14.

According to the processes described above, in the adjustment device 10 pertaining to this embodiment, the setting conditions of the various parameters associated with the management information and the like can be presented on the preview display screen when reading the management information in the mode of (Case 1). The user of the adjustment device 10 can refer to the setting conditions of the various parameters displayed on the preview display screen, and select the file including desired management information from among the files, folders and the like. According to the adjustment device 10 pertaining to this embodiment, the operability of the user participating in the adjustment operation is improved, and reduction in time pertaining to the adjustment operation can be expected.

Note that the embodiment described above can be appropriately changed and implemented in a range without departing from the gist of this disclosure. In the embodiments described above, the operation input to the adjustment screen has been described using the mouse click operation and the keyboard operation. Alternatively, the operation input may be a touch input operation through a touch panel or a touch pad.

REFERENCE SIGNS LIST

1 Servo control system
10 Servomotor adjustment device
11 CPU
12 Main memory
13 Auxiliary memory
14 Input unit
15 Output unit
16 Communication IF
17 Connection bus
20 Servo driver
30 Servomotor
40 Controlled object
50 Controller (PLC)

The invention claimed is:

1. A servo motor adjusting device comprising:
a display device;
input device;
a memory unit that stores a plurality of instructions; and
a processor coupled to the memory unit, the input device, and the display device, and configured to execute the instructions to perform operations comprising:
displaying, on the display device, an adjustment screen of a servo parameter set in a control device of a motor driving a controlled object;
obtaining a setting condition of an adjusted servo parameter based on display information displayed on the adjustment screen;
obtaining measurement data on a speed control result or a position control result of the motor driven according to the setting condition in association with at least the setting condition of the servo parameter;
displaying, on the display device, first graph data on the adjustment screen, the first graph data comprising: a Fast Fourier Transform (FFT) analysis result based on the measurement data; or change in speed or change in position based on the measurement data;
performing a simulation of response characteristics of the motor, based on an updated setting condition of the servo parameter and based on the FFT analysis result;
displaying, on the display device, second graph data comprising a result of the simulation on the adjustment screen;
obtaining the setting condition of the servo parameter associated with the measurement data of the first graph data, and saving, in the memory unit, at least the obtained setting condition and drawing information, in an area where the first graph data is displayed, as file content, upon occasion of in response to accepting a first operation input from the input device to the adjustment screen where the first graph data is displayed; and obtaining the setting condition of the servo parameter or the updated setting condition included in constituting a part of file content serving as a target of file selection and having a file name, in response to the target of the file selection comprising: the file content corresponding to the first graph data and including saved as file content having the setting condition of the servo parameter; or file content corresponding to the second graph data item saved as file content having the same and including the updated setting condition, from among one or more files saved in the memory unit and displayed in a first display area of a display screen, and displaying at least the obtained setting condition of the servo parameter or the updated setting condition on a preview screen that overlaps a plurality of displayed file names included in the first display area of the display screen in which the file name of the target of the file selection is displayed in response to interacting with the target of file selection with the input device.

2. The servo motor adjusting device according to claim 1, wherein the processor is configured to execute the instructions to perform operations further comprising obtaining the updated setting condition of the servo parameter, and saving, in the memory unit, at least the obtained updated setting condition and drawing information in an area where the second graph data is displayed, as file content, in response to upon occasion of accepting the first operation input from the input device to the adjustment screen where the second graph data is displayed.

3. The servo motor adjusting device according to claim 1, wherein the processor is configured to execute the instructions to perform operations further comprising:

displaying a first sub-window screen displayed on the adjustment screen in an overlapping manner, in response to upon occasion of accepting the first operation input from the input device to the adjustment screen where the first graph data or the second graph data is displayed;

inserting the obtained setting condition of the servo parameter or the updated setting condition into a predetermined display area in the first sub-window screen; and saving, in the memory unit, display information displayed in the first sub-window screen, and the drawing information in the area where the first graph data or the second graph data is displayed, as file content.

4. The servo motor adjusting device according to claim 1, wherein a size of an area where information in the file content is inserted is preliminarily fixed.

5. The servo motor adjusting device according to claim 3, wherein the processor is configured to execute the instructions to perform operations further comprising designating, as a non-overwritable area, a predetermined input area specifically associated with including setting conditions and in which at least the setting condition of the servo parameter or the updated setting condition in the first sub-window screen is inserted.

6. The servo motor adjusting device according to claim 1, wherein the processor is configured to execute the instructions to perform operations further comprising presenting, as a file name candidate, information where at least the setting condition of the servo parameter or the updated setting condition is inserted, in response to upon occasion of accepting a second operation input to the adjustment screen where the first graph data or second graph data is displayed.

7. The servo motor adjusting device according to claim 6, wherein the processor is configured to execute the instructions to perform operations further comprising assigning a name presented to the file name candidate to the first graph data or the second graph data, and save data in the memory unit.

8. The servo motor adjusting device according to claim 1, wherein the processor is configured to execute the instructions to perform operations further comprising displaying, on an adjustment history screen, a file name list of one or more first graph data items or second graph data items having previously been drawn on the adjustment screen, in response to upon occasion of a third operation input to the adjustment screen where the one or more first graph data items or the second graph data items are displayed.

9. The servo motor adjusting device according to claim 8, wherein a file name displayed on the adjustment history screen is a file name candidate including information where at least the setting condition of the servo parameter of the first graph data or the updated setting condition of the servo parameter of second graph data is inserted.

10. The servo motor adjusting device according to claim 8, wherein the processor is configured to execute the instructions to perform operations further comprising displaying the adjustment history screen on the adjustment screen in an overlapping manner.

11. The servo motor adjusting device according to claim 8, wherein the processor is further configured to execute the instructions to perform operations further comprising collectively saving, in the memory unit, one or more first graph data items or second graph data items selected from the file name list displayed on the adjustment history screen.

12. The servo motor adjusting device according to claim 1, wherein the processor is further configured to execute the instructions to perform operations further comprising obtaining information included in file name candidates of one or more first graph data items and second graph data items, wherein the one or more first graph data items and second graph data items are assigned the file name candidates and stored in the memory unit are displayed on the adjustment screen, and displaying the information included in obtained file name candidates on a second sub-window screen displayed on the adjustment screen in an overlapping manner.

13. The servo motor adjusting device according to claim 12, wherein the processor is further configured to execute the instructions to perform operations further comprising applying a color to a rectangular display frame of the second sub-window screen corresponding to and surrounding the one or more first graph data items and second graph data items, the color being of a color type of a display color applied to the one or more first graph data items and second graph data items displayed on the adjustment screen.

14. A servo motor adjusting method executed by a processor included in a servo adjusting device, the servo motor adjusting method comprising:

displaying an adjustment screen of a servo parameter set in a control device of a motor driving a controlled object;

obtaining a setting condition of an adjusted servo parameter based on display information displayed on the adjustment screen;

obtaining measurement data on a speed control result or a position control result of the motor driven according to the setting condition in association with at least the setting condition of the servo parameter;

displaying first graph data for displaying, on the adjustment screen, a Fast Fourier Transform (FFT) analysis result based on the measurement data, or change in speed or change in position based on the measurement data;

performing simulation of response characteristics of the motor, based on an updated setting condition of the servo parameter and based on the FFT analysis result;

displaying second graph data for displaying a result of the simulation on the adjustment screen;

obtaining the setting condition of the servo parameter associated with the measurement data of the first graph data, and saving, in a memory unit, at least the obtained setting condition and drawing information, corresponding to an area where the first graph data is displayed, as file content, in response to upon occasion of accepting a first operation input to the adjustment screen where the first graph data is displayed; and obtaining the setting condition of the servo parameter or the updated setting condition constituting a part of, included in file content serving as a target of file selection and having a file name, in a case of a response to the target of the file selection comprising: the file content corresponding to the first graph data and including saved as file content having the setting condition of the servo parameter; or file content corresponding to the second graph data item saved as file content having the same and including the updated setting condition: from among one or more files saved in the memory unit and displayed in a first display area of a display screen, and displaying at least the obtained setting condition of the servo parameter or the updated setting condition on a preview screen which overlaps a plurality of displayed file names included in the first display area of the display screen in which the file name of the target of the file selection is displayed in response to an interaction with the target of file selection.

15. The servo motor adjusting method according to claim 14, further comprising:

obtaining the updated setting condition of the servo parameter, and saving, in the memory unit, at least the obtained updated setting condition and drawing information in an area where the second graph data is displayed, as file content, in response to upon occasion of accepting the first operation input to the adjustment screen where the second graph data is displayed.

* * * * *